(12) United States Patent
Naruka et al.

(10) Patent No.: US 12,536,242 B1
(45) Date of Patent: Jan. 27, 2026

(54) SYSTEM AND METHOD FOR DETERMINING RELEVANCY OF WEB PAGES TO A USER QUERY

(71) Applicant: Bank of America Corporation, Charlotte, NC (US)

(72) Inventors: Chetan Singh Naruka, Gurugram (IN); Deepam Kumar Singh, Ghaziabad (IN); Shailendra Singh, Thane (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/882,330

(22) Filed: Sep. 11, 2024

(51) Int. Cl.
*G06F 16/9538* (2019.01)
*G06F 16/906* (2019.01)
*G06F 16/9535* (2019.01)

(52) U.S. Cl.
CPC ........ *G06F 16/9538* (2019.01); *G06F 16/906* (2019.01); *G06F 16/9535* (2019.01)

(58) Field of Classification Search
CPC . G06F 16/9538; G06F 16/906; G06F 16/9535
See application file for complete search history.

(56) References Cited

U.S. PATENT DOCUMENTS

| | | | | |
|---|---|---|---|---|
| 5,973,695 A * | 10/1999 | Walsh | ................... | G06F 40/143 715/255 |
| 6,189,019 B1 * | 2/2001 | Blumer | ................. | G06F 16/954 707/999.102 |
| 6,978,445 B2 * | 12/2005 | Laane | ................... | G06F 16/957 717/125 |
| 7,165,070 B2 * | 1/2007 | Page | ...................... | G06F 16/954 |
| 7,818,683 B2 * | 10/2010 | Sorin | .................... | G06F 16/954 715/768 |
| 8,826,112 B2 * | 9/2014 | Clark | ..................... | G06F 40/18 715/810 |
| 10,037,127 B2 * | 7/2018 | Moehrle | ............... | G06F 3/0482 |
| 10,846,775 B1 * | 11/2020 | Dai | ..................... | G06Q 30/0631 |
| 10,853,438 B1 * | 12/2020 | Spillane | ............... | G06F 16/955 |
| 10,943,063 B1 * | 3/2021 | Mccown | ................ | G06F 21/31 |

(Continued)

OTHER PUBLICATIONS

Chetan Singh Naruka, A system and method for generating a navigational map for performing a data interaction, U.S. Appl. No. 18/830,992, filed Sep. 11, 2024, pp. 1-72.

(Continued)

*Primary Examiner* — Mark E Hershley

(57) ABSTRACT

A machine learning model is run to assign one or more interaction categories to each webpage and webpage element. In response to receiving a request to perform a data interaction, a particular interaction category associated with the requested data interaction is determined. A plurality of webpages and webpage elements are determined that are assigned to the particular interaction category. A navigation map is generated to perform the data interaction, wherein the navigation map includes a sequence of webpages including webpage elements and information relating to one or more operations that are to be performed at each of the webpages and the webpage elements as part of performing the data interaction. The sequence of webpages and webpage elements are from the plurality of webpages and webpage elements that are assigned to the particular interaction category.

20 Claims, 7 Drawing Sheets

(56) References Cited

U.S. PATENT DOCUMENTS

| | | | | |
|---|---|---|---|---|
| 10,965,573 | B1* | 3/2021 | Mooneyham | G06F 9/542 |
| 11,137,870 | B2* | 10/2021 | Piper | G06Q 30/0641 |
| 11,182,053 | B2 | 11/2021 | Moehrle | |
| 11,741,191 | B1* | 8/2023 | Zilka | G06N 20/00 |
| | | | | 706/12 |
| 11,822,612 | B2* | 11/2023 | Jia | G06N 3/044 |
| 2001/0004260 | A1* | 6/2001 | Bauer | G06F 3/0482 |
| | | | | 345/418 |
| 2001/0008399 | A1* | 7/2001 | Oosterholt | G06Q 10/10 |
| | | | | 345/418 |
| 2003/0120779 | A1* | 6/2003 | Rodefer | G06F 16/9538 |
| | | | | 709/225 |
| 2003/0225891 | A1* | 12/2003 | Stienhans | G06F 16/9562 |
| | | | | 709/227 |
| 2006/0080292 | A1* | 4/2006 | Alanzi | G06F 16/951 |
| 2006/0129931 | A1* | 6/2006 | Simons | G06F 9/453 |
| | | | | 715/705 |
| 2007/0162422 | A1* | 7/2007 | Djabarov | G06F 16/2453 |
| 2008/0021638 | A1* | 1/2008 | Kobayashi | G01C 21/30 |
| | | | | 701/532 |
| 2009/0132524 | A1* | 5/2009 | Stouffer | G06F 16/9535 |
| | | | | 707/999.005 |
| 2010/0005061 | A1* | 1/2010 | Basco | G06F 16/355 |
| | | | | 704/9 |
| 2011/0258049 | A1* | 10/2011 | Ramer | G06Q 30/0273 |
| | | | | 705/14.69 |
| 2013/0204862 | A1* | 8/2013 | Marchiori | G06F 3/04817 |
| | | | | 707/722 |
| 2015/0127628 | A1* | 5/2015 | Rathod | G06Q 30/0251 |
| | | | | 707/710 |
| 2018/0322103 | A1* | 11/2018 | Yeo | G06V 40/1365 |
| 2018/0358022 | A1* | 12/2018 | Karnati | G10L 17/24 |
| 2019/0220871 | A1* | 7/2019 | Greenberger | G06F 3/017 |
| 2020/0186352 | A1* | 6/2020 | Arora | H04L 9/008 |
| 2020/0286145 | A1* | 9/2020 | Storm | G06Q 20/1235 |
| 2021/0357680 | A1* | 11/2021 | Chen | G06V 10/7753 |
| 2022/0043742 | A1* | 2/2022 | van Adelsberg | G06F 11/3698 |
| 2022/0078149 | A1* | 3/2022 | Hines | G06F 3/04842 |
| 2022/0374336 | A1* | 11/2022 | Brown | G06F 11/3684 |
| 2023/0118380 | A1* | 4/2023 | Krosinski | G06Q 20/405 |
| | | | | 705/44 |
| 2023/0298312 | A1* | 9/2023 | Saraee | G06F 16/483 |
| | | | | 382/157 |
| 2023/0306204 | A1* | 9/2023 | Dechu | G06F 16/3329 |
| 2023/0350967 | A1* | 11/2023 | Newman | G06F 3/0481 |
| 2024/0212315 | A1* | 6/2024 | Saraee | G06N 3/045 |
| 2024/0378856 | A1* | 11/2024 | Saraee | G06N 3/045 |
| 2024/0419706 | A1* | 12/2024 | Gutierrez | G06F 40/166 |
| 2024/0428291 | A1* | 12/2024 | Jain | G06Q 30/0251 |

OTHER PUBLICATIONS

Chetan Singh Naruka, A system and method for determining alternative webpages and webpage elements, U.S. Appl. No. 18/882,338, filed Sep. 11, 2024, pp. 1-72.

\* cited by examiner

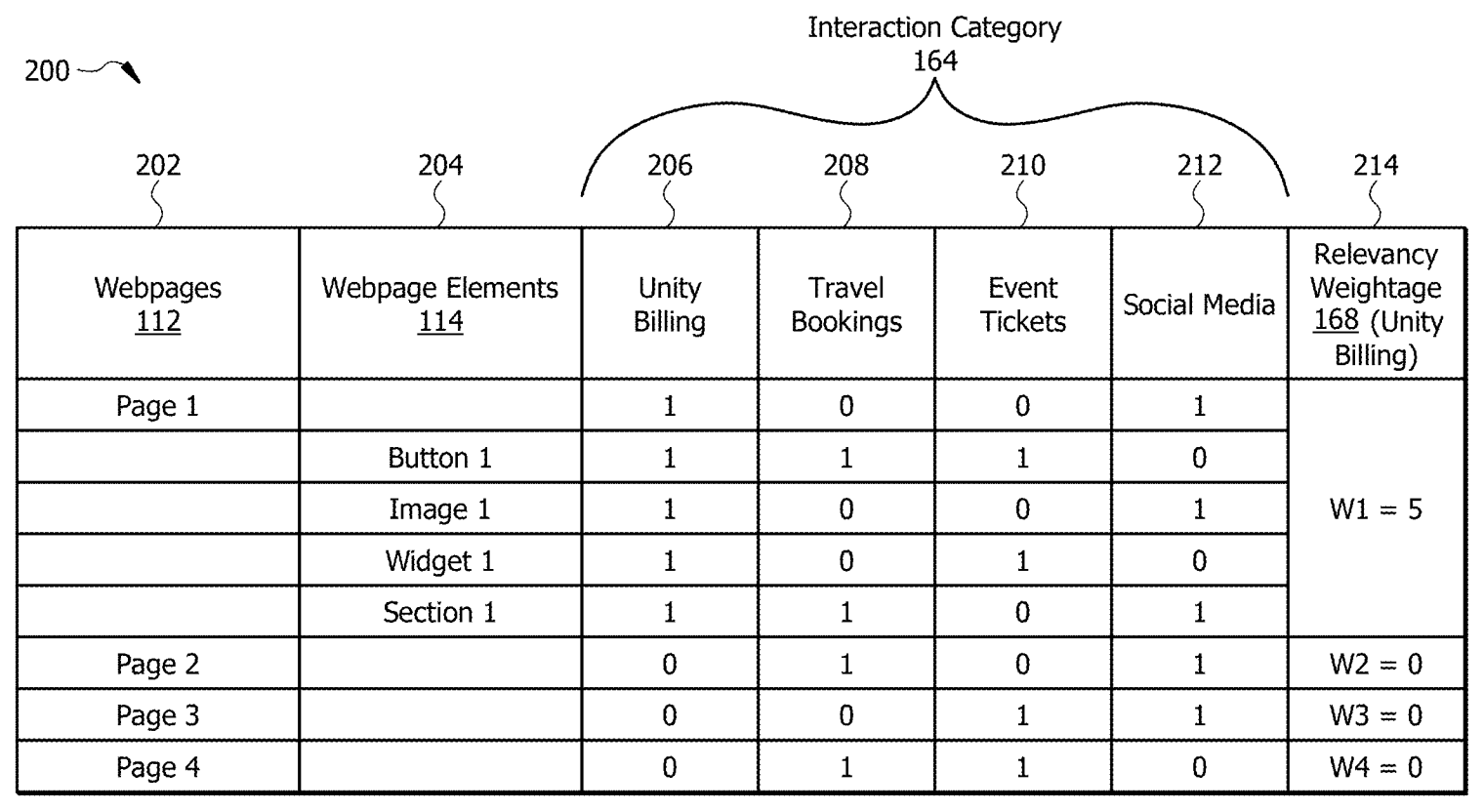

| Webpages 112 | Webpage Elements 114 | Unity Billing | Travel Bookings | Event Tickets | Social Media | Relevancy Weightage 168 (Unity Billing) |
|---|---|---|---|---|---|---|
| Page 1 | | 1 | 0 | 0 | 1 | |
| | Button 1 | 1 | 1 | 1 | 0 | W1 = 5 |
| | Image 1 | 1 | 0 | 0 | 1 | |
| | Widget 1 | 1 | 1 | 1 | 0 | |
| | Section 1 | 0 | 1 | 0 | 1 | |
| Page 2 | | 0 | 0 | 1 | 1 | W2 = 0 |
| Page 3 | | 0 | 1 | 1 | 0 | W3 = 0 |
| Page 4 | | | | | | W4 = 0 |

*FIG. 2*

| | Page 1 | Page 2 | Page 3 | Button 1 |
|---|---|---|---|---|
| https://ABC.com/page1.aspx | 0 | 4 | 7 | 9 |
| https://XYZ.com/page2.aspx | 4 | 0 | 3 | 5 |
| https://ABC.com/page3.aspx | 7 | 3 | 0 | 2 |
| https://ABC.com/page1.aspx/button1 | 9 | 5 | 2 | 0 |

*FIG. 3*

Interaction Category 164

| 402 | 404 | 406 | 408 |
|---|---|---|---|
| Utility Billing | Page 1 | Page 3 | Page 21 |
| Travel Bookings | Page 11 | Page 13 | Page 14 |
| Event Tickets | Page 2 | Page 5/Button | Page 7 |
| Social Media | Page 21 | Page 8/Link | Page 6 |

*FIG. 4*

SYSTEM AND METHOD FOR DETERMINING RELEVANCY OF WEB PAGES TO A USER QUERY

TECHNICAL FIELD

The present disclosure relates generally to network communication, and more specifically to a system and method for determining relevancy of webpages to a user query.

BACKGROUND

A user may operate a computing node (e.g., a personal computer) to perform a data interaction within a computing infrastructure. Performing a data interaction in a digital environment typically includes navigating through several websites/webpages and performing specific operations on each website/webpage to achieve the desired end goal. The challenge here is that navigating a digital domain requires fair knowledge of the structure and order of the webpages and webpage elements included in the webpages. Additionally, an organization's digital portal (e.g., website) often includes large product catalogs, customizable services and multiple entities that make navigation of the associated webpages challenging, as overlapping information across webpages can confuse users. It is also hard to educate users to travel through a most relevant navigational path (website/page) to achieve their goal. Further, the design of webpages may vary depending on a user device (e.g., mobile device, tablet computer, desktop computer, VR headset etc.) used by the user, causing the user experience to change across different device platforms.

SUMMARY

The system and method implemented by the system as disclosed in the present disclosure provide technical solutions to the technical problems discussed above by providing technology that helps a user navigate a digital environment (e.g., including a plurality of webpages and webpage elements) to perform a desired data interaction. For example, the disclosed system and methods provide the practical application of generating a navigation map that includes a sequence of webpages and information relating to one or more operations at each webpage to perform a desired data interaction.

As described in embodiments of the present disclosure, an interaction manager receives a user request to perform a data interaction, wherein the user request includes a user query describing the requested data interaction. The interaction manager may have access to a database that stores data needed to generate a navigation map for performing the requested data interaction. For example, the database may store a plurality of webpages, webpage elements included in those webpages, webpage metadata, interaction channels supported by each of the webpages, historical activity log of previous data interactions performed by users including completion times relating to performing those data interactions, relationships between webpages/webpage elements including category mappings, correlation matrix, correlation metric, and page/element alternatives. The interaction manager may be configured to generate a search function including one or more secondary queries configured to search the database and extract from the database data related to the user query associated with the user request for use in generating a navigation map to perform the requested data interaction. The one or more secondary queries are generated based on the information relating to the requested data interaction that is interpreted from the user query. For example, a secondary query may be configured to search the database for those webpages and webpage elements that support a particular interaction category associated with the requested data interaction. In another embodiment, a secondary query may be configured to search the database for alternative webpages/webpage elements that can perform the same set of operations.

Once the required data has been extracted from the database, the interaction manager may generate, based on the extraction data, a navigation map to perform the requested data interaction. The navigation map includes a page sequence including a sequence of webpages and webpage elements, and information relating to one or more operations that are to be performed at each of the webpages and webpage elements as part of performing the requested data interaction. In one embodiment, the navigation map provides the shortest path to perform the requested data interaction, wherein the shortest path comprises a page sequence including a minimum number of webpages and webpage elements, and accompanying information relating to a minimum number of operations that can be performed using the page sequence to complete the requested data interaction. The navigation map is then presented to the requesting user, wherein the user may follow the stepwise instructions provided in the navigation map to perform the data interaction.

By generating a navigation map including a sequence of webpages and associated stepwise information/instructions to perform a requested data interaction allows a user to perform a data interaction without reviewing unwanted webpages and webpage elements for lack of knowledge relating to a website. This may reduce the webpage traffic and network traffic as users visit only those webpages that are actually needed to perform a desired data interaction. Reducing webpage traffic improves processing efficiency of processors (e.g., web servers) that process requests from users. Further, reduced network traffic improves network efficiency of data networks that connect user devices to web servers. For example, the navigation map may provide the shortest path to perform the requested data interaction, wherein the shortest path comprises a page sequence including a minimum number of webpages and webpage elements, and accompanying information relating to a minimum number of operations that can be performed using the page sequence to complete the requested data interaction. Thus, the navigation path causes a user to visit the minimum number of webpages, perform a minimum number of operations on those webpages, and spent a minimum time to complete the desired data interaction. This saves computing and network resources which otherwise would have been used in performing the same data interaction using a longer navigation path including vising more webpages, performing more operations and spending more time and resources to complete the data interaction. Thus, the disclosed system and method save processing resources, memory resources and network resources (e.g., network bandwidth), thus improving the performance of the computing devices processing the data interaction and improving the network efficiency of the network that is used to exchange data between a user device and the computing devices.

The disclosed system and method provide an additional practical application of improving database performance by reducing a search space related to searching data from the database. For example, the interaction manager identifies an interaction category associated with the requested data interaction and searches the database for only those webpages and webpage elements that support the interaction category associated with the requested data interaction. The navigation map is then generated from only those webpages and webpage elements that support the interaction category associated with the requested data interaction. By searching the database for only a subset of the webpages and webpage elements stored in the database, the disclosed system and methods reduce the search space associated with searching the database, thus improving the speed and performance of the database and the computer (e.g., server) hosting the database. Further, by generating the navigation map based on a reduced number of webpages and webpage elements (e.g., those that support the particular interaction category), the disclosed system and methods improve the speed of generation of the navigation map by a computing node, thus improving the speed and efficiency of the computing node.

The disclosed system and method provide an additional practical application of improving the performance of a computing node that generates the navigation map by replacing unavailable or unresponsive webpages with alternative webpages. For example, for each webpage, the interaction manager may determine at least one alternative webpage that performs an operation that is same or similar to the operation performed by the webpage. Once the navigation map has been generated, if a particular webpage included in the navigation map is unresponsive, the interaction manager replaces the particular webpage with its alternative webpage. By replacing an unresponsive webpage with its alternative, the disclosed system and method avoids users from attempting to visit the unresponsive webpage and attempting to perform operations at the unresponsive webpage, which wastes computing and network resources. By saving computing and network resources, the disclosed system and method improve performance of computing nodes that process the data interaction and improve performance of the network that is used to exchange data related to the data interaction.

By improving performance of computers and networks, the disclosed system and method generally improve the technology associated with data processing and computing networks.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example table that shows category mappings including assignment of interaction categories to webpages and webpage elements, in accordance with one or more embodiments of the present disclosure;

FIG. 3 illustrates an example correlation matrix, in accordance with one or more embodiments of the present disclosure;

FIG. 4 illustrates an example table that shows alternative webpages and webpage elements, in accordance with one or more embodiments of the present disclosure;

DETAILED DESCRIPTION

Figure 1:
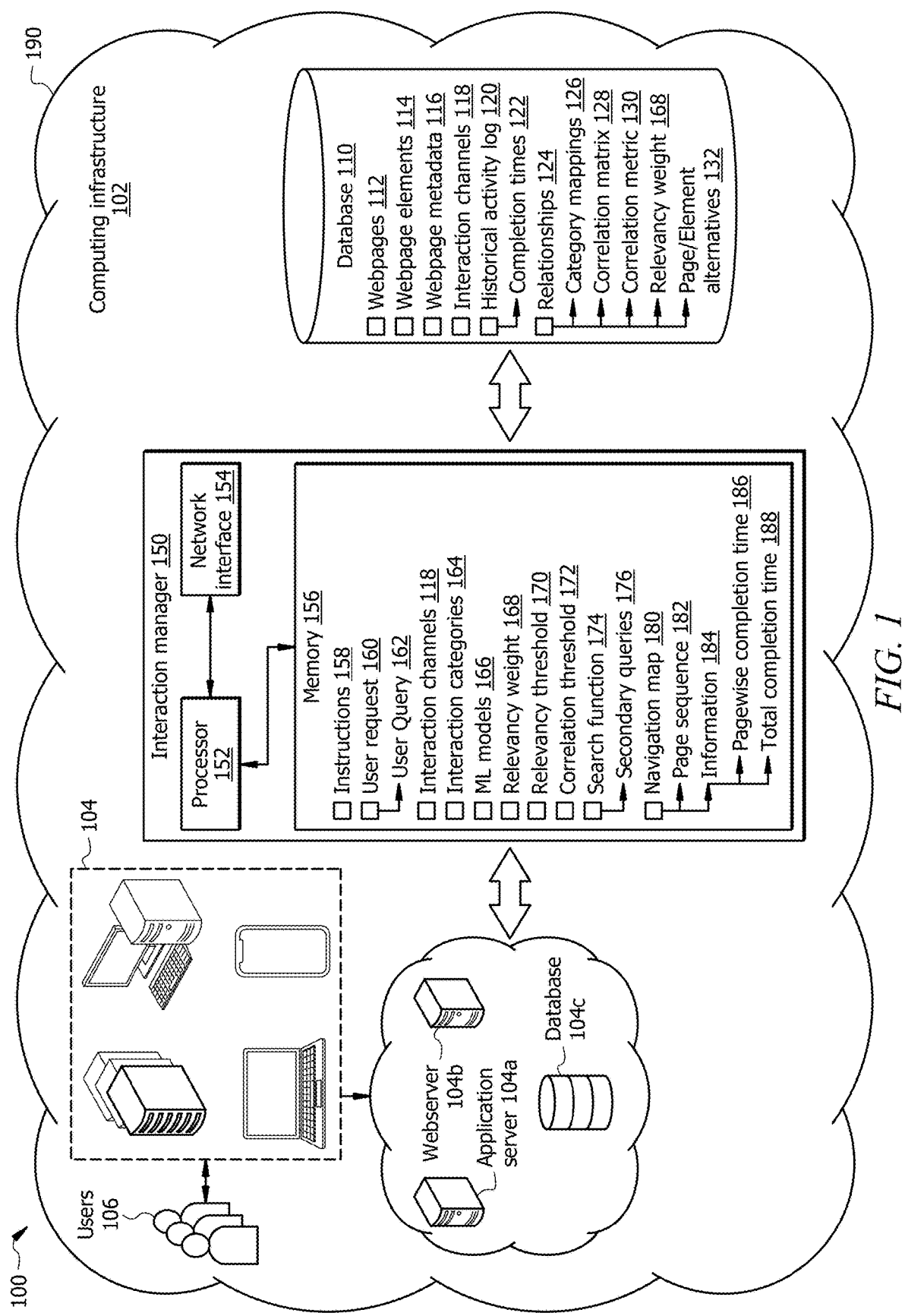
FIG. 1 is a schematic diagram of a system, in accordance with certain aspects of the present disclosure.

FIG. 1 is a schematic diagram of a system 100, in accordance with certain aspects of the present disclosure. As shown, system 100 includes a computing infrastructure 102 connected to a network 190. Computing infrastructure 102 may include a plurality of hardware and software components. The hardware components may include, but are not limited to, computing nodes 104 such as desktop computers, smartphones, tablet computers, laptop computers, servers, databases and data centers, mainframe computers, virtual reality (VR) headsets, augmented reality (AR) glasses and other hardware devices such as printers, routers, hubs, switches, and memory all connected to the network 190. Software components may include software applications that are run by one or more of the computing nodes 104 including, but not limited to, operating systems, user interface applications, third party software, database management software, service management software, mainframe software, metaverse software, AI tools and other customized software programs (e.g., interaction manager 150) implementing particular functionalities. For example, software code relating to one or more software applications may be stored in a memory device and one or more processors (e.g., belonging to one or more computing nodes 104) may execute the software code to implement respective functionalities. An example software application run by one or more computing nodes 104 of the computing infrastructure 102 may include the interaction manager 150. In one embodiment, at least a portion of the computing infrastructure 102 may be representative of an Information Technology (IT) infrastructure of an organization.

One or more of the computing nodes 104 may be operated by a user 106. In this context, a computing node 104 operated by a user 106 may be referred to as a user device. For example, a computing node 104 may provide a user interface using which a user 106 may operate the computing node 104 to perform data interactions within the computing infrastructure 102. The term "computing node 104" may be replaced by "user device" in this disclosure when the computing node 104 is operated by a user 106.

One or more computing nodes 104 of the computing infrastructure 102 may be representative of a computing system which hosts software applications that may be installed and run locally or may be used to access software applications running on a server. The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices. In certain embodiments, one or more of the computing nodes 104 may be representative of a server running one or more software applications to implement respective functionality as described below. In certain embodiments, one or more of the computing nodes 104 may run a thin client software application where the processing is directed by the thin client but largely performed by a central entity such as a server (not shown).

Network 190, in general, may be a wide area network (WAN), a personal area network (PAN), a cellular network, or any other technology that allows devices to communicate electronically with other devices. In one or more embodiments, network 190 may be the Internet.

As described above, a user 106 may operate a computing node 104 (e.g., a personal computer) to perform a data interaction within the computing infrastructure 102. For example, a user 106 may operate a user device (e.g., one of the computing nodes 104) to perform a particular data interaction within the computing infrastructure 102. Example data interactions that may be performed by a user 106 may include, but are not limited to, applying for a visa, renewing vehicle registration, renewing auto or home insurance, payment of utility bills, and purchasing airline tickets. Performing each of these data interactions typically includes navigating through several websites/webpages and performing specific operations on each website/webpage to achieve the desired end goal. The challenge here is that navigating a digital domain requires fair knowledge of the structure and order of the webpages and webpage elements included in the webpages. Additionally, an organizations digital portal (e.g., website) often includes large product catalogs, customizable services and multiple entities that make navigation of the associated webpages challenging, as overlapping information across webpages can confuse users. It is also hard to educate users to travel through a most relevant navigational path (website/page) to achieve their goal. Users need to know where and how to start their digital journey based on their requirement. Further, the design of webpages may vary depending on a user device (e.g., mobile device, tablet computer, desktop computer, VR headset etc.) used by the user causing the user experience to change across different device platforms. In the context of the present disclosure the term "webpage" refers to a document which can be displayed in a web browser such as Firefox, Google Chrome, Opera, Microsoft Edge, or Apple Safari. Webpages are also often called just "pages." The term "website" refers to a collection of webpages which are grouped together and usually connected together in various ways. The term "webpage element or page element" refers to design features included in a webpage including, but not limited to, a widget, a button, a hyperlink, text, an image, a text field, a radio button, or a check box included in the webpage. Further, it may be noted that a webpage may support one or more interaction channels. For example, a webpage may support mobile browsers that run on mobile devices, web browsers that run on desktop computers and laptop computers, and/or 3-dimensional virtual interfaces such as metaverse.

Embodiments of the present disclosure describe techniques that help a user 106 to navigate a digital environment (e.g., including a plurality of webpages and webpage elements) to perform a desired data interaction. In one embodiment, the disclosed techniques include generating a navigation map 180 that includes a shortest navigation path across a plurality of webpages to perform a desired data interaction.

At least a portion of the computing infrastructure 102 (e.g., one or more computing nodes 104) may implement an interaction manager 150 which may be configured to implement techniques for generating a navigation map 180 to perform a data interaction requested by a user 106. The interaction manager 150 includes a processor 152, a memory 156, and a network interface 154. The interaction manager 150 may be configured as shown in FIG. 1 or in any other suitable configuration.

The processor 152 includes one or more processors operably coupled to the memory 156. The processor 152 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 152 may be a programmable logic device, a microcontroller, a microprocessor, or any suitable combination of the preceding. The processor 152 is communicatively coupled to and in signal communication with the memory 156. The one or more processors are configured to process data and may be implemented in hardware or software. For example, the processor 152 may be 8-bit, 16-bit, 32-bit, 64-bit or of any other suitable architecture. The processor 152 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions, such as software instructions. For example, the one or more processors are configured to execute instructions 158 to implement the interaction manager 150. In this way, processor 152 may be a special-purpose computer designed to implement the functions disclosed herein. In one or more embodiments, the interaction manager 150 is implemented using logic units, FPGAs, ASICs, DSPs, or any other suitable hardware. The interaction manager 150 is configured to operate as described with reference to FIGS. 6, 7 and 8. For example, the processor 152 may be configured to perform at least a portion of methods 600, 700 and 800 as described with reference to FIGS. 6, 7, and 8, respectively.

The memory 156 includes a non-transitory computer-readable medium such as one or more disks, tape drives, or solid-state drives, and may be used as an over-flow data storage device, to store programs when such programs are selected for execution, and to store instructions and data that are read during program execution. The memory 156 may be volatile or non-volatile and may include a read-only memory (ROM), random-access memory (RAM), ternary content-addressable memory (TCAM), dynamic random-access memory (DRAM), and static random-access memory (SRAM).

The memory 156 is operable to store the instructions 158, user request 160 including user query 162, one or more interaction channels 118, one or more interaction categories 164, one or more machine learning (ML) models 166, relevancy weight 168, relevancy threshold 170, correlation threshold 172, search function 174 including one or more secondary queries 176, navigation maps 180 including respective page sequence 182 and information 184 associated with each navigation map 180 such as page wise completion time 186 and total completion time 188, and any other data needed to perform operations of the interaction manager 150 as described in embodiments of the present disclosure. The instructions 158 may include any suitable set of instructions, logic, rules, or code operable to execute the interaction manager 150. It may be noted that each ML model 166 may include ML algorithm that, when run by the processor 152, performs operations related to the ML model 166.

The network interface 154 is configured to enable wired and/or wireless communications. The network interface 154 is configured to communicate data between the interaction manager 150 and other devices, systems, or domains (e.g., computing nodes 104, database 110 etc.). For example, the network interface 154 may include a Wi-Fi interface, a LAN interface, a WAN interface, a modem, a switch, or a router. The processor 152 is configured to send and receive data using the network interface 154. The network interface 154 may be configured to use any suitable type of communication protocol as would be appreciated by one of ordinary skill in the art.

It may be noted that each of the computing nodes 104 and the database 110 may be implemented like the interaction manager 150 shown in FIG. 1. For example, each of the computing nodes 104 and the database 110 may have a respective processor and a memory that stores data and instructions to perform a respective functionality of the computing node 104 or the database 110.

In one or more embodiments, the interaction manager 150 may be configured to generate a navigation map 180 based on a user request 160 initiated by a user 106 to perform a particular data interaction. In this context, the interaction manager 150 may be configured to receive a user request 160 for performing a particular data interaction, wherein the user request 160 may include a user query 162 that describes the particular data interaction which the user 106 desires to perform. For example, the user query 162 may include a text query such as "how to pay water bill on my smartphone". However, it may be noted that the user query 162 may also be an audio or video message. A utility services' website may provide several alternative methods to navigate the website to find the user's water bill and pay it. For example, the user 106 may select a "Login" link on a home page of the website, login to the user's online utility account using login credentials (e.g., username and password) registered for the user 106, select "billing statements" on a user account page to display another page listing water billing statements, select the billing statement the user desires to pay, select a payment option, enter payment details (e.g. payment card details) if necessary, and select a "Submit" button to submit the payment. Alternatively, the user 106 may select a "pay water bill" button on the home page, enter a unique bill ID on the next page to display the water bill, and then select a payment option and pay the bill. Likewise, the utility services' website may provide several other paths the user 106 may take to pay the water bill. Unless the user is digitally aware and is generally comfortable navigating websites over the internet, it may be challenging for the user 106 to find the home page of the utility services' website and then navigate through several webpages 112 needed to successfully pay the utility bill. Even for experienced users, it may be challenging to determine the shortest path including the minimum number of steps that can be taken to complete the desired data interaction. In this example, the interaction manager 150 may generate a navigation map 180 for performing the requested data interaction based on the user query 162, wherein the navigation map 180 includes a page sequence 182 including a sequence of webpages 112 and webpage elements 114 and information 184 relating to one or more operations that are to be performed at each of the webpages as part of performing the data interaction. In one embodiment, the navigation map 180 provides the shortest path to perform the requested data interaction, wherein the shortest path comprises a minimum number of operations that can be performed using the page sequence 182 to perform the data interaction.

As described in more detail below, the interaction manager 150 uses several pieces of information to generate an appropriate navigation map 180 to serve a user request 160. As described below, some of this information may be generated by the interaction manager 150. For example, the interaction manager 150 may have access to a database 110 that stores data needed to generate a navigation map 180. As shown in FIG. 1, the database 110 may store a plurality of webpages 112, webpage elements 114 included in those webpages 112, webpage metadata 116, interaction channels 118 supported by each of the webpages 112, historical activity log 120 of previous data interactions performed by users 106 including completion times 122 relating to performing those data interactions, relationships 124 between webpages 122/webpage elements 114 including category mappings 126, correlation matrix 128, correlation metric 130, and page/element alternatives 132.

The webpages 112, webpage elements 114 and the webpage metadata 116 may be sourced from several data sources, wherein one or more of these data sources may be computing nodes 104 of the computing infrastructure 102. For example, the interaction manager 150 may have access to a plurality of data sources that store/host and/or run webpages 112. As shown in FIG. 1, example data sources may include, but are not limited to, one or more application servers 104a, one or more web servers 104b and one or more databases 104c. An application server 104a or a web server 104b is a computer that hosts a website which typically is a collection of webpages 112. In one embodiment, a data source may be owned and/or operated by a digital entity that provides a set of digital services using a set of webpages 112 hosted by the data source. For example, an application server 104a may be owned and/or operated by a utility provider that allows registered utility users to perform data interactions such as payment of utility bills using webpages 112 stored and run on the application server 104a. Another application server 104a may be owned and/or operated by a video streaming service that allows registered users of the streaming service to add, upgrade and drop services using the webpages 112 stored and run on the application server 104a. In one or more embodiments, one or more of the data sources may be a cloud server (not shown).

As described above, the term "webpage" (e.g., webpage 112) refers to a document which can be displayed in a web browser such as Firefox, Google Chrome, Opera, Microsoft Edge, or Apple Safari. Webpages are also often called just "pages." The term "webpage element or page element" (e.g., webpage element 114) refers to design features included in a webpage including, but not limited to, a widget, a button, a hyperlink, text, an image, a text field, a radio button, a section of a webpage, or a check box included in the webpage. The database 110 stores webpage metadata 116 associated with each webpage 112. Webpage metadata 116 associated with a particular webpage 112 includes, but is not limited to, information relating to the webpage 112 such as a network address (e.g., URL) for the webpage, a description of the webpage elements 114 included in the webpage 112, one or more operations that may be performed using each webpage element 114 of the webpage 112, and one or more interaction channels 118 supported by the webpage 112. The term "interaction channel" (e.g., interaction channel 118) in the context of the present disclosure refers to a type or class of software application and/or type of computing device (e.g., computing node 104). Example interaction channels 118 may include, but are not limited to, a mobile application that typically runs on a mobile device such as a smart phone and tablet computer, a web application such as a web browser that runs on a desktop computers and laptop computers, and virtual reality applications such as metaverse that run on virtual reality (VR) glasses. For each webpage 112, the database 110 stores an indication of one or more interactions channels 118 supported by the webpage 112. For example, a particular webpage 112 may support a single interaction channel 118 (e.g., web application only) or multiple interaction channels 118 (e.g., web application as well as mobile application).

Historical activity log 120 is a record of previous data interactions that were performed by users 106 and includes information such as user query 162 that initiated a data interaction, a page sequence 182 including a sequence of webpages 112 and webpage elements 114 used to perform the data interactions, operations performed at each webpage 112 and using each webpage element 114, completion times 122 including time spent on each webpage 112 and total completion time to perform the data interaction using the page sequence 182, and any other information related to the data interaction.

Relationships 124 may include information relating to one or more interaction categories 164 associated with each webpage 112 and webpage element 114. The term "interaction category", in the context of the present disclosure, refers to a type of operation that can be performed using a webpage 112 or webpage element 114 associated to an interaction category 164. Example interaction categories may include, but are not limited to, utility billing, travel bookings, event tickets, social media etc. It may be noted that a webpage 112 or a webpage element 114 may be associated with multiple interaction categories. For example, a payment related webpage that accepts user payments may be configured to be used for utility billing, travel bookings as well as purchasing event tickets. The association between webpages 112/webpage elements 114 and particular interaction categories 164 may be stored as category mappings 126 which are further described below. For example, when the category mappings 126 indicates that a particular webpage 112 is associated with utility billings, this means that the particular webpage 112 may be used to perform at least one operation relating to utility billings.

Relationships 124 may further include information relating to a relationship between any two webpages 112, any two webpage elements 114, and a webpage 112 and webpage element 114. For example, a correlation matrix 128, which is further described below, indicates a degree of similarity between each pair of webpages 112, each pair of webpage elements 114, and each pair of webpage 112 and webpage element 114. As further described below, the correlation matrix 128 represents the degree of similarity as a correlation metric 130 which is a numerical value that indicates the degree of similarity between a pair of webpages 112, a pair of webpage elements 114 or a pair of webpage 112 and webpage element 114.

Page/element alternatives 132 refers to information relating to alternative webpages 112 or webpage elements 114 that are configured to perform at least one same or similar operation. For example, for a particular webpage 112 the database 110 may store information relating to one or more alternative webpages 112 that are configured to perform at least one same or similar operation also configured to be performed by the particular webpage 112. Similarly, for a particular webpage element 114 the database 110 may store information relating to one or more alternative webpage elements 114 that are configured to perform at least one same or similar operation also configured to be performed by the particular webpage element 114.

In one embodiment, the database 110 is a graph database which is a special type of database that, unlike a typical database, stores information as a network of data nodes and relationships between pairs of data nodes. A graph database is custom-built to manage highly connected data. As the connectedness and volume of modern data increase, graph databases present an opportunity to utilize and analyze the data efficiently and cost-effectively. Relational database models become less optimal as the volume and depth of relationships increase. This results in data duplication and redundancy as multiple tables need processing to discover query results. In contrast, graph database performance improves by several orders of magnitude when querying relationships. Performance stays constant even when graph data volume increases. Graph databases work using a standardized query language and graph algorithms. Graph query languages are used to interact with a graph database. The language has features to add, edit, and query data and take advantage of the underlying graph structures to process complex queries (e.g., secondary queries 176) efficiently. Graph queries are shorter and more efficient at generating the same reports compared to relational databases. Graph technologies take advantage of linked nodes. Traversing the joins or relationships is a very fast process, as the relationships between nodes are not calculated at query times but are persisted in the database.

In one or more embodiments, interaction manager 150 may be configured to determine the category mappings 126. As described above, category mappings 126 refer to association between a webpage 112/webpage element 114 and one or more interaction categories 164. In other words, when the category mappings 126 indicates that a particular webpage 112 is associated with a particular interaction category 164 (e.g., utility billing), this means that the particular webpage 112 relates to the particular interaction category 164 and/or may be used to perform at least one operation relating to the particular interaction category 164. The interaction manager 150 may be configured to assign one or more interaction categories 164 to each webpage 112 and webpage element 114 obtained from a data source such as application server 104a, web server 104b, and database 104c. In this context, the interaction manager 150 may use a machine learning (ML) model 166 that is trained to assign one or more interaction categories 164 to a webpage 112 or a webpage element 114 of the webpage 112 based on webpage metadata 116 associated with the webpage 112. For example, the interaction manager 150 may be configured to input to the ML model 166, a webpage 112 and webpage metadata 116 associated with the webpage 112. The ML model 166 may determine and assign one or more interaction categories 164 to the webpage 112 based on the webpage metadata 116 associated with the webpage 112. Similarly, the interaction manager 150 may be configured to input to the ML model 166, a webpage element 114 of a webpage 112 and webpage metadata 116 associated with the webpage 112. The ML model 166 may determine and assign one or more interaction categories 164 to the webpage element 114 based on the webpage metadata 116 associated with the webpage 112 of which the webpage element 114 is a part.

In one embodiment, assigning an interaction category 164 to a particular webpage 112 or a webpage element 114 may include assigning a binary value of '1' to each interaction category 164 determined to be associated with the webpage 112 or the webpage element 114 respectively, and assigning a binary value of '0' to each interaction category 164 determined not be associated with the webpage 112 or the webpage element 114 respectively.

FIG. 2 illustrates an example table 200 that shows category mappings 126 including assignment of interaction categories 164 to webpages 112 and webpage elements 114, in accordance with one or more embodiments of the present disclosure. As shown, column 202 of table 200 shows four example webpages 112 (shown as page 1, page 2, page 3 and page 4). Column 204 shows example webpage elements 114 of the webpages 112. For ease of illustration, only page 1 is shown to include webpage elements 114 (shown as button 1, image 1, widget 1, and section 1). However, it may be appreciated that pages 2-4 may also include respective webpage elements 114. Columns 206, 208, 210 and 212 show four distinct interaction categories 164, "utility billing", "travel bookings", "event tickets" and "social media" respectively. Column 214 shows relevancy weights 168 associated with the interaction category "utility billing". Relevancy weight 168 is further explained below.

In table 200, a binary value of '1' assigned to a webpage 112 or webpage element 114 in a particular interaction category 164 indicates that the respective webpage 112 or webpage element 114 relates to the particular interaction category 164. For example, binary '1' is assigned to page 1 and each of the four webpage elements 114 (button 1, image 1, widget 1 and section 1) in the "utility billing" interaction category 164. This means that the overall page 1 and each webpage element of page 1 were determined (e.g., by the ML model 166) to relate to "utility billing" interaction category 164. On the other hand, a binary value of '0' assigned to a webpage 112 or webpage element 114 in a particular interaction category 164 indicates that the respective webpage 112 or webpage element 114 does not relate to the particular interaction category 164. For example, binary '0' is assigned to page 1 in the "travel bookings" and "event tickets" interaction categories 164. This means that page 1 does not relate to the "travel bookings" and "event tickets" interaction categories 164. Further, a binary '0' is assigned to pages 2, 3 and 4 in the "utility billings" interaction category 164. This means that pages 2, 3 and 4 do not relate to the "utility billings" interaction category 164. As shown in table 200, a particular webpage 112 or webpage element 114 may relate to multiple interaction categories 164. For example, page 1 relates to "utility billings" as well as "social media". Similarly, "button 1" relates to "utility billings", "travel bookings", and "event tickets". In one or more embodiments, the interaction manager 150 may be configured to store in the database 110 the category mappings 126 (e.g., table 200 or portion thereof) associated with the webpages 112 and webpage elements 114. Additionally, or alternatively, the interaction manager 150 may be configured to determine category mappings 126 for new webpages 112 as and when they are available and store the newly determined category mappings 126 in the database 110. As further described below, the interaction manager 150 may use the category mappings 126 stored in the database 110 for generating navigation maps 180.

In one or more embodiments, the interaction manager 150 may be configured to determine a relevancy weight 168 for a particular webpage 112 based on the category mappings 126 associated with the webpage 112. The relevancy weight 168 assigned to a particular webpage 112 is indicative of a degree of relevancy of the webpage 112 to a user query 162 received as part of a user request 160 to perform a data interaction. For example, when the user query 162 states "how to pay water bill on my smartphone", each webpage 112 or webpage element 114 that relates to the "utility billing" interaction category 164 has a higher degree of relevancy to the user query 162 as compared to webpages 112 and webpage elements 114 that do not relate to the "utility billing" interaction category 164. In one embodiment, the relevancy weight 168 assigned to a webpage 112 for a particular interaction category 164 is a numerical value calculated based on the binary values assigned to the webpage 112 and its webpage elements 114 in the particular interaction category 164. In one embodiment, the interaction manager 150 is configured to determine the numerical value of the relevancy weight 168 for a webpage 112 in a particular interaction category 164 by adding the binary values assigned to the webpage 112 and webpage elements 114 of the webpage 112. For example, as shown in table 200, the relevancy weight 168 assigned to page 1 in the "utility billings" interaction category 164 is '5', which is a sum of the binary '1s' assigned to the overall page 1 and each of the four webpage elements 114 in the "utility billings" interaction category 164. It may be appreciated that different webpages 112 may have different relevancy weights 168 depending on the binary values assigned to the respective webpages 112 and their respective webpage elements 114. A higher numerical value of the relevancy weight 168 generally means a higher degree of relevancy as compared to a lower numerical value. For example, a higher number of '1s' assigned to a webpage 112 in an interaction category 164 will result in a higher numerical value of the relevancy weight 168 for the webpage 112 in the interaction category 164, meaning that the webpage 112 has a higher degree of relevancy to the interaction category 164.

In one or more embodiments, the interaction manager 150 may be configured to determine the relevancy weight 168 of the webpages 112 stored in the database 110 in real time after receiving the user request 160 containing the user query 162. For example, in response to receiving the user request 160, the interaction manager 150 may determine an interaction category 164 to which the requested data interaction relates to and then calculate a relevancy weight 168 for each webpage 112 in the determined interaction category 164 relating to the requested data interaction. For example, when the user query 162 states "how to pay water bill on my smartphone", the interaction manager 150 determines a relevancy weight 168 for each webpage 112 in the "utility billings" interaction category. In one embodiment, the interaction manager 150 may be configured to store in the database 110 the relevancy weights 168 assigned to the webpages 112.

In one or more embodiments, the interaction manager 150, as part of generating a navigation map 180, may be configured to use the category mappings 126 stored in the database 110 and/or the relevancy weights 168 determined based on the category mappings 126 and the user query 162. As described above, the interaction manager 150 may be configured to generate a navigation map 180 based on a user request 160 initiated by a user 106 to perform a particular data interaction, wherein the user request 160 may include a user query 162 that describes the particular data interaction which the user 106 desires to perform. For example, the user query 162 may include a text query such as "how to pay water bill on my smartphone". In response to receiving the user request 160, the interaction manager 150 may be configured to extract several pieces of information from the user query 162 included in the user request 160 and determine the particular data interaction requested to be performed and certain information relating to the data interaction. For example, based on the user query 162 "how to pay water bill on my smartphone", the interaction manager 150 may determine that the requested data interaction relates to the "utility billing" interaction category 164 and may further determine that the data interaction is to be performed using a mobile application as the interaction channel 118. Further, the interaction manager 150 may determine that the data interaction includes payment of water bill.

After determining information relating to the requested data interaction based on the user query 162, the interaction manager 150 may be configured to extract from the database 110 data needed to generate the navigation map 180. For example, the interaction manager 150 may be configured to extract from the database 110 data including, but not limited to, metadata associated with a plurality of webpages 112 and webpage elements 114, historical activity logs 120 associated with previous data interactions that are same or similar to the requested data interaction, category mappings 126 associated with the webpages 112 and the webpage elements 114, correlation matrix 128 and page/element alternatives 132. In this context, the interaction manager 150 may be configured to generate a search function 174 including one or more secondary queries 176 configured to search the database 110 and extract from the database 110 data related to the user query 162 associated with the user request 160 for use in generating a navigation map 180 to perform the requested data interaction. The one or more secondary queries 176 are generated based on the information relating to the requested data interaction that is interpreted from the user query 162. In one embodiment, a secondary query 176 may be configured to search the database 110 for those webpages 112 and webpage elements 114 that are associated with a particular interaction category 164 determined based on the user query 162. Following the utility billing example, based on determining (e.g., based on the user query 162) that the requested data interaction relates to the "utility billing" interaction category 164, a secondary query 176 may be configured to search the database 110 for those webpages 112 and webpage elements 114 that are associated with the "utility billing" interaction category 164. For example, the secondary query 176 may be configured to search the category mappings 126 (e.g., table 200 shown in FIG. 2) to determine the webpages 112 and webpage elements 114 that are assigned to the "utility billing" interaction category 164.

In an additional or alternative embodiment, the secondary query 176 may be configured to search the database 110 for those webpages 112 that are assigned a relevancy weight 168 equaling or exceeding a relevancy threshold 170 in a particular interaction category 164, wherein the particular interaction category 164 was determined based on the user query 162 related to the requested data interaction. Following the utility billing example, the secondary query 176 may be configured to search the database 110 and determine those webpages 112 that are assigned a relevancy weight 168 equaling or exceeding the relevancy threshold 170 in the "utility billing" interaction category 164. In one embodiment, the relevancy threshold 170 may be a threshold numerical value (e.g., as shown in FIG. 2), wherein the secondary query 176 selects all those webpages 112 that are assigned a numerical value of the relevancy weight 168 that equal or exceed the threshold numerical value.

In an additional or alternative embodiment, the secondary query 176 may be configured to search the database 110 and determine those webpages 112 and webpage elements 114 that support the interaction channel 118 associated with the requested data interaction. Following the utility billing example in which the interaction manager 150 determines based on the user query 162 that the requested data interaction is to be performed using a mobile application as the interaction channel 118, the secondary query 176 may be configured to search the database 110 and determine those webpages 112 and webpage elements 114 that support a mobile application.

In an additional or alternative embodiment, a secondary query 176 may be configured to search the database 110 and determine those webpages 112 and webpage elements 114 that were used to previously perform a data interaction that was same or similar to the requested data interaction. For example, the interaction manager 150 may search the historical activity log 120 to determine webpages 112 and webpage elements 114 associated with one or more previously performed data interactions that were same or similar to the requested data interaction. For example, the interaction manager 150 may generate a secondary query 176 that searches the database 110 and determines those webpages 112 and webpage elements 114 that were used to perform the previous data interaction. Following the utility billing example, the interaction manager 150 may generate a secondary query 176 configured to search the historical activity log 120 and determine webpages 112 and webpage elements 114 associated with one or more previously performed data interactions that relate to payment of water bill or other utility bills.

It may be noted that, in each of the embodiments described above, the interaction manager 150 may be configured to extract from the database 110 a plurality of webpages 112, a plurality of webpage elements 114 as well as webpage metadata 116 associated with the extracted webpages 112 and webpage elements 114. As further described below, the webpage metadata 116 may be used, at least in part, to determine the navigation map 180.

In one or more embodiments, the interaction manager 150 may be configured to use an ML model 166 to generate the search function 174 including one or more secondary queries 176 described above. For example, the ML model 166 may be configured to generate a search function 174 based on several pieces of data input to the ML model 166. In one embodiment, this ML model 166 is different from the ML model 166 used to generate the category mappings 126 described above. For example, the interaction manager 150 may be configured to input the particular data interaction requested to be performed (e.g. determined based on the user query 162), one or more of the interaction channels 118 associated with the requested data interaction (e.g., determined based on user query 162), or interaction category 164 associated with the requested data interaction (e.g., determined based on user query 162). The interaction manager 150 may be configured to obtain a search function 174 including one or more secondary queries 176 as an output of the ML model 166. The interaction manager 150 may be configured to search the database 110 (as described above) based on the one or more secondary queries 176 of the search function 174 to determine/extract one or more of a plurality of webpages 112, a plurality of webpage elements 114, webpage metadata 116 associated with the extracted webpages 112 and webpage elements 114, or relationships 124 between the extracted webpages 112 and webpage elements 114 (e.g., category mappings 126, at least a portion of the correlation matrix, and/or page/element alternatives 132).

The interaction manager 150 may be configured to generate a navigation map 180 based on at least a portion of the data extracted from the database 110. In one embodiment, the interaction manager 150 may use an ML model 166 to generate the navigation map 180 to help a user 106 perform a requested data interaction. The ML model may be trained to generate navigation maps 180 based on data extracted from the database 110 as described above. For example, the interaction manager 150 may input at least a portion of the data extracted from the database 110 into the ML model 166 and run the ML model 166 to obtain the navigation map 180 as an output of the ML model 166.

As described above, the navigation map 180 includes a page sequence 182 including a sequence of webpages 112 and webpage elements 114, and information 184 relating to one or more operations that are to be performed at each of the webpages 112 and webpage elements 114 as part of performing the requested data interaction. In one embodiment, the navigation map 180 provides the shortest path to perform the requested data interaction, wherein the shortest path comprises a page sequence 182 including a minimum number of webpages 112 and webpage elements 114, and accompanying information relating to a minimum number of operations that can be performed using the page sequence 182 to complete the requested data interaction. For example, the navigation map 180 includes a stepwise flow of a plurality of steps to be followed for performing the data interaction, wherein each step of the plurality of steps comprises one or more of an identification of a particular webpage 112 of the page sequence 182 and/or a webpage element 114 of a webpage 112, one or more operations that are to be performed at the particular webpage 112 or webpage element 114, or information 184 including instructions to perform the one or more operations and/or an estimated time to complete the one or more operations. The estimated time to complete the one or more operations may include one or more of a page-wise completion time 186 or a total completion time 188. Page-wise completion time 186 includes an estimated time to complete one or more operations on a particular webpage 112 of the navigation map 180. The total completion time 188 includes an estimated time to complete all steps/operations of the navigation map 180. In addition, the information 184 at each step of the navigation map 180 may include any other information that may help the user or the user 106 may need to perform one or more operations at the step. For example, information 184 associated with a particular step may suggest that the user 106 watch a short instructional video and/or information relating to one or more files that the user 106 may need to download or upload from a webpage 112.

For example, following the utility billing example described above, the navigation map 180 may include, a link to a home webpage 112 of the utility service's website and an instruction to click on the link to open the home webpage 112, an instruction to select "pay water bill" button on the home webpage 112, an instruction to enter a unique bill ID on the next webpage 112 to display the water bill of the user 106, an instruction to select a payment option and enter payment details on the next webpage 112, an instruction to click on a "submit payment" button after entering the payment details. At each step, the navigation map 180 may include several other pieces of information (e.g., in addition to instruction for performing one or more operations) including, but not limited to, the page-wise completion time 186 or the total completion time 188.

In one or more embodiments, the interaction manager 150 may be configured to determine the page-wise completion time 186 or the total completion time 188 associated with the navigation map 180 based, at least in part, upon the historical activity log 120. As shown in FIG. 1, the historical activity log 120 stored in the database 110 includes completion times 122 associated with previously performed data interactions. The completion times 122 associated with a previously performed data interaction may include, but are not limited to, one or more of time spent by a user 106 on each webpage 112, time spent by a user 106 to perform a particular operation using a webpage element 114 (e.g., upload documents), or total time spent to perform the data interaction using a plurality of webpages 112 and webpage elements 114.

Based on the completion times 122 associated with webpages 112 and webpage elements 114 included in the historical activity log 120, the interaction manager 150 may be configured to determine an estimated page-wise completion time 186 for a webpage 112 included in the navigation map 180. For example, the interaction manager 150 may be configured to search the historical activity log 120 for completion times 122 associated with a particular webpage 112. For example, the interaction manager 150 may extract times spent by users 106 on the particular webpage 112 when performing data interactions (e.g., including same or similar data interactions as the requested data interaction). Based on the times spent on the particular webpage 112 during several previously performed data interactions, the interaction manager 150 determines an average time taken to complete one or more operations at the particular webpage 112. In one embodiment, the average time taken is an average of the times spent on the particular webpage 112 during several previously performed data interactions. This average time taken is designated as the estimated page-wise completion time 186 for the particular webpage 112 and included as part of the information 184 associated with the navigation map 180.

In an additional or alternative embodiment, based on the completion times 122 associated with webpages 112 and webpage elements 114 included in the historical activity log 120, the interaction manager 150 may be configured to determine an estimated total completion time 188 associated with the navigation map 180. As described above, the total completion time 188 includes an estimated time to complete all steps/operations using the page sequence 182 of the navigation map 180. The interaction manager 150 determines an estimated page-wise completion time 186 for each webpage 112 included in the page sequence 182 of the navigation map 180 as described above. The interaction manager 150 then determines the estimated total completion time 188 for the navigation map 180 by adding the page-wise completion times 186 for all webpages 112 included in the page sequence 182. The estimated total completion time 188 is included as part of the information 184 associated with the navigation map 180.

In one more additional or alternative embodiments, the interaction manager 150 may be configured to generate the navigation map 180 based only on those webpages 112 and webpage elements 114 that support the interaction channel 118 associated (e.g., to be used) with the requested data interaction. In other words, the navigation map 180 only includes webpages 112 and webpage elements 114 that support the interaction channel 118 associated with the requested data interaction. For example, as described above, the interaction manager 150 may generate (e.g., using an ML model 166) a search function 174 including a secondary query 176 that is configured to search the database 110 and determine those webpages 112 and webpage elements 114 that support the interaction channel 118 associated with the requested data interaction. Once these webpages 112 and webpage elements 114 are obtained from the database 110, the interaction manager 150 may generate the navigation map 180 based only on those webpages 112 and webpage elements 114 that support the particular interaction channel 118 to be used for the requested data interaction. This ensures that all webpages 112 and webpage elements 114 included as part of the navigation map 180 support the particular interaction channel 118 to be used by the user 106 to perform the requested data interaction.

In one or more additional or alternative embodiments, the interaction manager 150 may be configured to include as part of the navigation map 180 one or more webpages 112 and/or webpage elements 114 from one or more previously performed data interactions that were same or similar to the requested data interaction. As described above, the interaction manager 150 may search the historical activity log 120 to determine webpages 112 and webpage elements 114 associated with one or more previously performed data interactions that were same or similar to the requested data interaction. By including webpages 112 and webpage elements from similar data interactions, the interaction manager 150 leverage data experience of other users 106 in performing similar data interactions. This may improve the efficiency of determining the right webpages 112 and webpage elements 114 for use in performing the requested data interactions, which in turn may improve the speed with which the navigation map 180 may be generated.

In one or more embodiments, the interaction manager 150 may be configured to generate the correlation matrix 128. As described above, the correlation matrix 128 indicates a degree of similarity between each pair of webpages 112, each pair of webpage elements 114, and each pair of webpage 112 and webpage element 114. In one embodiment, the correlation matrix 128 represents the degree of similarity as a correlation metric 130 which is a numerical value that indicates the degree of similarity between a pair of webpages 112, a pair of webpage elements 114 or a pair of webpage 112 and webpage element 114.

FIG. 3 illustrates an example correlation matrix 128, in accordance with one or more embodiments of the present disclosure. As shown in FIG. 3, the example correlation matrix 128 is a table that indicates a degree of similarity between each pair of webpages 112, each pair of webpage elements 114, and each pair of webpage 112 and webpage element 114. As shown, column 302 of the correlation matrix 128 lists out a plurality of webpages 112 and webpage elements 114, wherein each field in column 302 includes a link to a webpage 112 or a webpage element 114. Each of the remaining columns 304-310 is assigned to one of the webpages 112 or webpage elements 114 listed in column 302. The example correlation matrix 128 includes 3 webpages 112 (shown as page 1, page 2 and page 3) and one webpage element 114 (shown as button 1 of page 1). It may be noted while the example correlation matrix 128 is shown to include 3 webpages 112 (shown as page 1, page 2 and page 3) and one webpage element 114 (shown as button 1) for each of illustration, a typical correlation matrix 128 may include any number of webpages 112 and webpage elements 114.

As shown in FIG. 3 each field in columns 304-310 includes a numerical value between 0 and 9, wherein each numerical value represents the correlation metric 130 that indicates the degree of similarity between a pair of webpages 112, a pair of webpage elements 114 or a pair of webpage 112 and webpage element 114. In other words, each numerical value of the correlation metric 130 indicates a degree of similarity between a particular pair of webpages 112, between a particular pair or webpage elements 114, or between a particular webpage 112 and a particular webpage element 114. For example, the correlation metrics 130 in row 312 indicate the similarity between page 1 and each of page 1, page 2, page 3 and button 1. For example, the correlation metric 130 in the first field of column 304 indicates a degree of similarity between Page 1 and itself. The correlation metric 130 in the first field of column 306 indicates a degree of similarity between Page 1 and Page 2. The correlation metric 130 in the first field of column 308 indicates a degree of similarity between Page 1 and Page 3. The correlation metric 130 in the first field of column 310 indicates a degree of similarity between Page 1 and button 1. Similarly, the correlation metrics 130 in row 314 indicate the similarity between page 2 and each of page 1, page 2, page 3 and button 1. The correlation metrics 130 in row 314 indicate the similarity between page 3 and each of page 1, page 2, page 3 and button 1. The correlation metrics 130 in row 318 indicate the similarity between button 1 of page 1 and each of page 1, page 2, page 3 and button 1. In the example correlation matrix 128, a higher numerical value of the correlation metric 130 indicates a higher degree of similarity as compared to a lower numerical value of the correlation metric 130. For example, a numerical value of '1' indicates a lowest degree of similarity, whereas a numerical value of '9' indicates the highest degree of similarity. Further, a numerical value of '0' of the correlation metric 130 indicates that the correlation metric 130 represents a comparison of a webpage 112 or webpage element 114 to itself. For example, the field at row 312 and column 304 compares page 1 to itself and thus is assigned a correlation metric of '0'. It may be noted that while the example correlation matrix 128 shown in FIG. 3 shows numerical values of correlation metric 130 on a scale of 0 and 9, it may be appreciated that the numerical values of correlation metric 130 may be assigned over any scale (e.g., 0-50, 0-100 etc.).

In one or more embodiments, the interaction manager 150 may use an ML model 166 to generate the correlation matrix 128 (e.g., as shown in FIG. 3) and assign the correlation metric 130 to each pair of webpages 112, each pair of webpage elements 114, and each pair of webpage 112 and webpage element 114. In one embodiment the ML model 166 may be trained to generate the correlation matrix 128 based on webpage metadata 116 associated with the webpages 112 and the webpage elements 114. For example, the interaction manager 150 may be configured to input to the ML model 166, a plurality of webpages 112, a plurality of webpage elements 114, and webpage metadata 116 associated with the webpages 112 and the webpage elements 114. The interaction manager 150 may then run the ML model 166 to obtain the correlation matrix 128 as an output of the ML model 166. In one embodiment, once generated, the correlation matrix 128 is stored in the database 110 for use in generating page/element alternatives 132 and/or for generating navigation maps 180. It may be noted that the ML model 166 trained to generate the correlation matrix 128 may be same as or different from the ML model 166 trained to generate the category mappings 126, the ML model trained to generate the search function 174, and/or the ML model trained to generate the navigation map 180.

In one or more embodiments, the interaction manager 150 may be configured to generate the page/element alternatives 132, for example, based at least one the correlation matrix 128. As described above, page/element alternatives 132 refers to information relating to alternative webpages 112 or webpage elements 114 that are configured to perform at least one same or similar operation. In other words, each of the alternative webpages 112 may be used to perform a same or similar operation such that an alternative webpage may take the place of another webpage in relation to performing the operation. For example, multiple webpages 112 may allow a user to submit a payment for a utility bill. In this case, the multiple webpages 112 may be used as alternatives to each other. For a particular webpage 112 the database 110 may store information relating to one or more alternative webpages 112 that are configured to perform at least one same or similar operation also configured to be performed by the particular webpage 112. Similarly, for a particular webpage element 114 the database 110 may store information relating to one or more alternative webpage elements 114 that are configured to perform at least one same or similar operation also configured to be performed by the particular webpage element 114.

In one embodiment, to determine one or more alternatives to a particular webpage 112, interaction manager 150 may search the correlation matrix 128 for all those webpages 112 that have at least a threshold value (shown as correlation threshold 172 in FIG. 1) of the correlation metric 130 relating to the particular webpage 112. In other words, the interaction manager 150 identifies all those webpages 112 that have at least a threshold degree of similarity to the particular webpage 112. For example, referring to FIG. 3, to determine an alternative to page 1, the interaction manager 150 examines the numerical values of the correlation metric 130 in row 312. Assuming that the correlation threshold 172 is 5, the interaction manager 150 identifies page 3 as a potential alternative webpage 112. Button 1 with a value of 9 is ignored as button 1 is part of page 1. Once one or more potential webpages 112 having a value of correlation metric 130 that equals or exceeds the correlation threshold 172 are identified, the interaction manager 150 determines one or more alternative to the particular webpage 112 from the identified one or more potential alternatives. For example, the interaction manager 150 may determine from the potential alternative webpages an alternative webpage 112 that has this highest numerical value of the correlation metric 130 relating to the particular webpage 112. This alternative webpage 112 is designated as the primary alternative webpage 112. The interaction manager 150 may be configured to identify one or more additional alternative webpages 112 that are associated with the next highest value of the correlation metric 130. The determined alternative webpages 112 of the particular webpage 112 are stored as page/element alternatives 132 in database 110.

FIG. 4 illustrates an example table 400 that shows alternative webpages 112 and webpage elements 114, in accordance with one or more embodiments of the present disclosure.

Columns 406 and 408 include alternatives to the webpages 112 listed in column 404. Column 406 includes a primary alternative and column 408 includes a secondary alternative. For example, referring to the first row of the table 400, page 3 is the primary alternative to page 1 and page 21 is the secondary alternative to page 1. This means that either of page 3 and page 21 can be used as an alternative to page 1, wherein page 3 is to be used as the first alternative and page 21 is to be used as the second alternative. In one embodiment, column 406 includes webpages 112 that are associated with the highest value of the correlation metric 130 in relation to the respective webpage in column 404. Column 408 includes webpages 112 that are associated with the next highest value of the correlation metric 130 in relation to the respective webpage 112 in column 404. For example, referring back to FIG. 3, page 3 is associated with a correlation metric 130 of '7' and is determined as the primary alternative to page 1 as shown in FIG. 4. Page 21 may have the next highest value of the correlation metric 130 in relation to page 1 and thus is used as the second alternative to page 1.

In one or more embodiments, the interaction manager 150 may be configured to use an ML model 166 to determine the page/element alternatives 132. The ML model 166 may be trained to determine one or more alternatives to a particular webpage 112/webpage element 114 based on the correlation matrix. In one embodiment, the interaction manager 150 may input a candidate webpage 112 and the correlation matrix 128 as input to the ML model and obtain one or more alternative webpages 112 to the candidate webpage 112 as an output of the ML model 166. It may be noted that the ML model 166 trained to generate the page/element alternatives 132 may be the same or different from the ML model 166 trained to generate the correlation matrix 128, the ML model 166 trained to generate the category mappings 126, the ML model trained to generate the search function 174, and/or the ML model trained to generate the navigation map 180.

In one or more embodiments, the interaction manager 150 may be configured to first group the webpages 112 and webpage elements 114 into respective interaction categories 164 and then determine alternatives to a webpage 112/webpage element 114 associated with a particular interaction category 164 from other webpages 112/webpage elements 114 that are grouped into the same particular interaction category 164. For example, to determine one or more alternatives to a particular webpage 112 that is associated to a particular interaction category 164, the interaction manager 150 may search the category mappings 126 for a set/group of webpages 112 that are assigned to the same interaction category 164. Once a set of webpages 112 that are assigned to the same interaction category 164 have been identified, the interaction manager 150 may determine one or more alternatives to the particular webpage 112 from the set of webpages assigned to the same interaction category 164 as described above, for example, based on the correlation metrics 130 of the webpages 112 in the identified set. Referring to table 400 of FIG. 4, the alternative webpages 112/page elements 114 in each row of the table 400 belong to the same interaction category 164, namely, utility billing, travel bookings, event tickets, or social media. By determining alternatives to a webpage 112/webpage element 114 from other webpages 112/webpage elements 114 that are assigned to the same interaction category 164, the interaction manager 150 improves the match between the alternatives and reduces false alternatives from being determined.

In one or more embodiments, the interaction manager 150 may be configured to use the page/element alternatives 132 in generating a navigation map 180. For example, when a particular webpage 112 in the page sequence 182 generated for a navigation map 180 is unavailable (e.g., due to technical issues), the interaction manager 150 may search the page/element alternatives 132 stored in the database 110 and replace the unavailable webpage 112 in the page sequence 182 with an alternative webpage 112. For example, referring back to table 400 shown in FIG. 4, when page 1 from the page sequence 182 is unavailable, the interaction manager 150 may replace page 1 with page 3 which is the primary alternative of page 1. This avoids the navigation map 180 or a portion thereof from being unusable for non-availability of a webpage 112 or webpage element 114.

In one or more embodiments, once the navigation map 180 has been generated, the interaction manager 150 may be configured to present the navigation map 180 including the page sequence 182 and the information 184 to the requesting user 106 using an interaction channel 118 of the user's choice. For example, when the user 106 places the user request 160 using a web browser running on a personal computer, the interaction manager 150 may render a visual representation of the navigation map 180 in the user's web browser. However, the interaction manager 150 may be configured to display the navigation map using one or more of a plurality of interaction channels 118 including, but not limited to, mobile application, web application, and metaverse application. The user 106 may follow the steps presented in the navigation map 180 and perform operations based on information 184 included in the navigation map 180 at each step of the navigation map 180.

Figure 5:
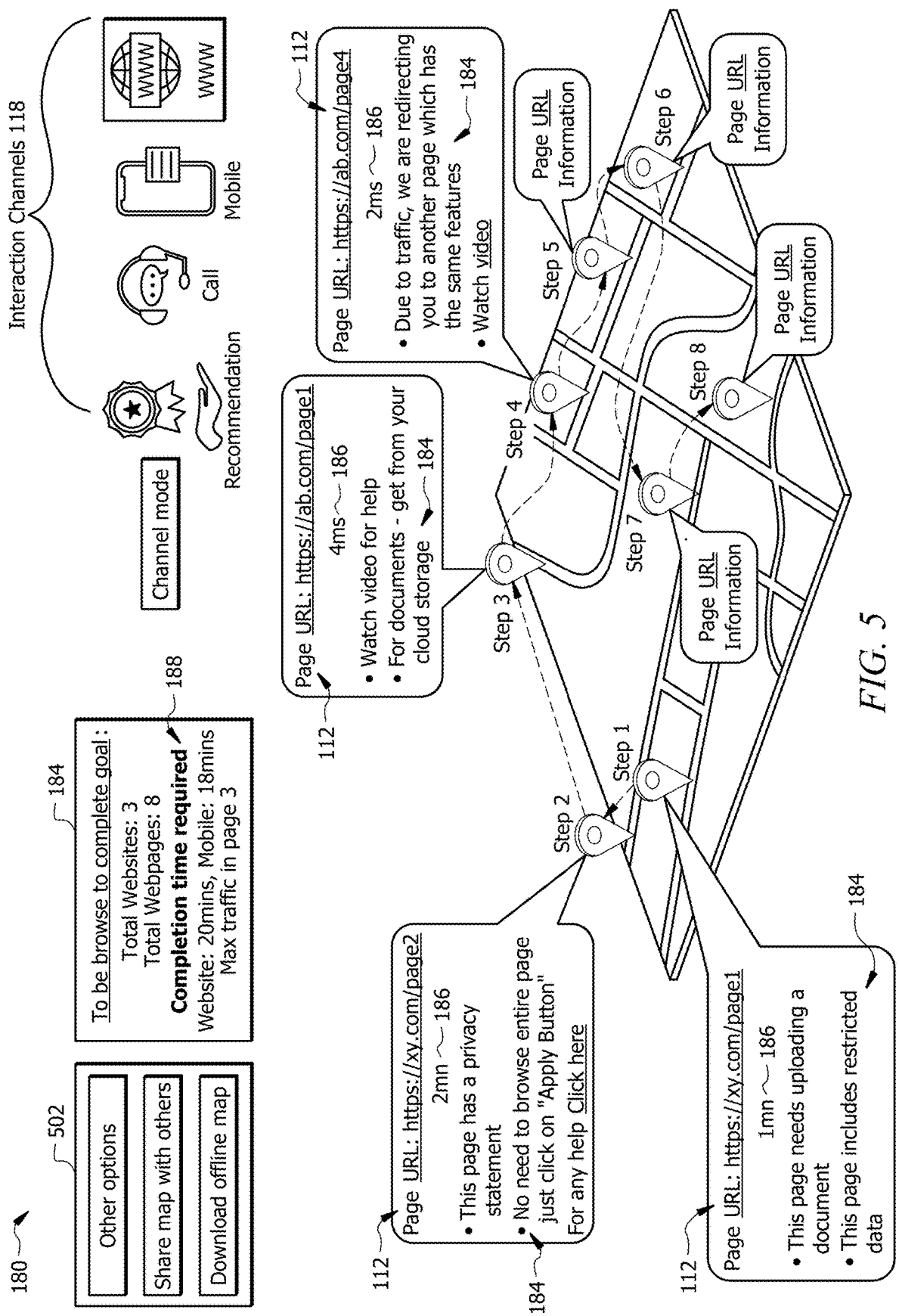
FIG. 5 illustrates an example navigation map, in accordance with one or more embodiments of the present disclosure.

FIG. 5 illustrates an example navigation map 180, in accordance with one or more embodiments of the present disclosure.

As shown in FIG. 5, the example navigation map 180 includes a visual rendering/representation of a page sequence 182 including a plurality of steps (shown as steps 1-8). As shown each step of the navigation map 180 includes a link to a particular webpage 112 and information 184 relating to the particular webpage 112 such as a page-wise completion time 186, information relating to one or more operations to be performed on the particular page, and any other helpful information that may aid the user 106 to perform operations on the particular page. In one embodiment, at each of the steps 1-8, the link to a webpage 112 is selectable, wherein selecting the link of the webpage 112 (e.g., clicking on the link of the webpage 112 using a mouse pointer) may cause redirection to the webpage 112 to allow the user 106 to perform one or more operations on the webpage 112. As shown in FIG. 5, the interaction manager 150 allows a selection between a plurality of interaction channels 118 including, but not limited to, mobile application, web application, and metaverse application. In the example of FIG. 5, a web browser has been chosen for displaying the navigation map 180. In one embodiment, the interaction manager 150 may be configured to display other information 184 associated with the navigation map 180 such as one or more of total websites to navigate, total webpages to navigate, or estimated total completion time 188 to navigate through the entire navigation map 180 and perform all operations associated with the requested data interaction. The interaction manager 150 may provide some other useful options 502 to the user 106 such as sharing the navigation map 180 with other users 106 and/or downloading an offline copy of the navigation map 180.

Figure 6:
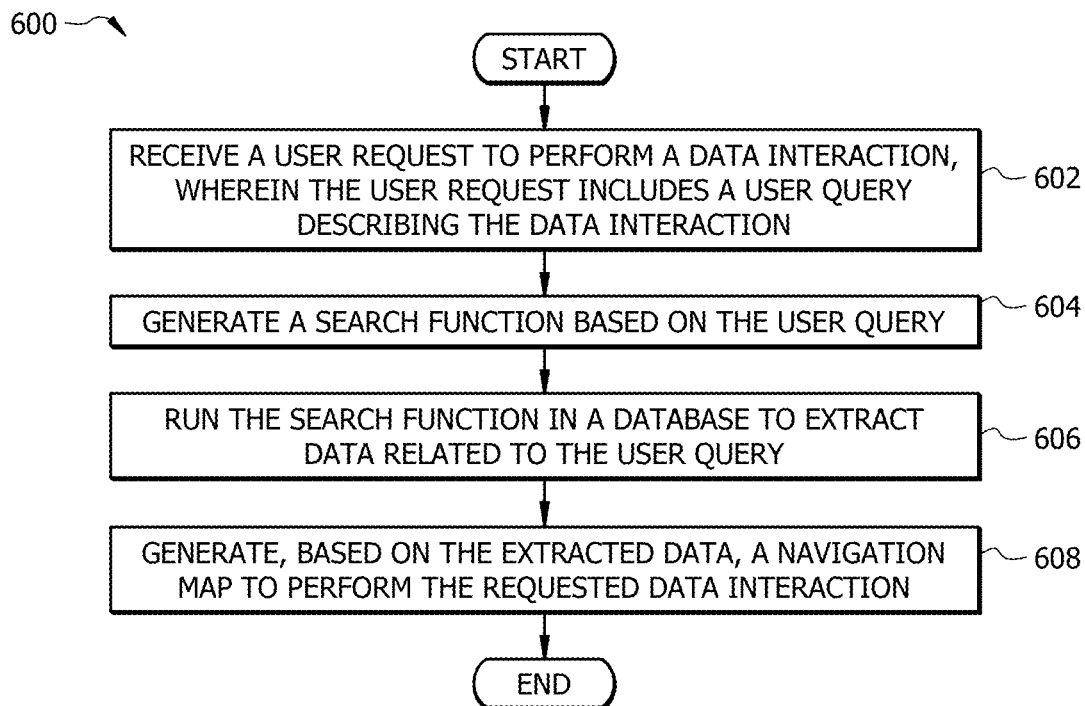
FIG. 6 illustrates a flowchart of an example method for generating a navigation map to perform a data interaction, in accordance with one or more embodiments of the present disclosure.

FIG. 6 illustrates a flowchart of an example method 600 for generating a navigation map 180 to perform a data interaction, in accordance with one or more embodiments of the present disclosure. Method 600 may be performed by the interaction manager 150 shown in FIG. 1. The following description relating to method 600 may also refer back to FIGS. 2, 3, 4, and 5.

At operation 602, interaction manager 150 receives a user request 160 to perform a data interaction, wherein the user request 160 includes a user query 162 describing the data interaction.

As described above, the interaction manager 150 may be configured to generate a navigation map 180 based on a user request 160 initiated by a user 106 to perform a particular data interaction. In this context, the interaction manager 150 may be configured to receive a user request 160 for performing a particular data interaction, wherein the user request 160 may include a user query 162 that describes the particular data interaction which the user 106 desires to perform. For example, the user query 162 may include a text query such as "how to pay water bill on my smartphone". However, it may be noted that the user query 162 may also be an audio or video message.

At operation 604, the interaction manager 150 generates a search function 174 based on the user query 162, wherein the search function 174 comprises one or more secondary queries 176 configured to search the database 110 and extract from the database 110 data related to the user query 162 associated with the user request 160.

At operation 606, the interaction manager 150 runs the search function 174 in the database 110 to extract the data related to the user query 162, wherein the extracted data at least comprises a set of webpages 112, metadata (e.g., webpage metadata 116) associated with the webpages 112 in the set of webpages 112, and relationships 124 between one or more of the webpages 112 in the set of webpages 112.

As described above, the interaction manager 150 uses several pieces of information to generate an appropriate navigation map 180 to serve a user request 160. As described below, some of this information may be generated by the interaction manager 150. For example, the interaction manager 150 may have access to a database 110 that stores data needed to generate a navigation map 180. As shown in FIG. 1, the database 110 may store a plurality of webpages 112, webpage elements 114 included in those webpages 112, webpage metadata 116, interaction channels 118 supported by each of the webpages 112, historical activity log 120 of previous data interactions performed by users 106 including completion times 122 relating to performing those data interactions, relationships 124 between webpages 122/webpage elements 114 including category mappings 126, correlation matrix 128, correlation metric 130, and page/element alternatives 132.

As described above, the interaction manager 150 may be configured to generate a navigation map 180 based on a user request 160 initiated by a user 106 to perform a particular data interaction, wherein the user request 160 may include a user query 162 that describes the particular data interaction which the user 106 desires to perform. For example, the user query 162 may include a text query such as "how to pay water bill on my smartphone". In response to receiving the user request 160, the interaction manager 150 may be configured to extract several pieces of information from the user query 162 included in the user request 160 and determine the particular data interaction requested to be performed and certain information relating to the data interaction. For example, based on the user query 162 "how to pay water bill on my smartphone", the interaction manager 150 may determine that the requested data interaction relates to the "utility billing" interaction category 164 and may further determine that the data interaction is to be performed using a mobile application as the interaction channel 118. Further, the interaction manager 150 may determine that the data interaction includes payment of water bill.

After determining information relating to the requested data interaction based on the user query 162, the interaction manager 150 may be configured to extract from the database 110 data needed to generate the navigation map 180. For example, the interaction manager 150 may be configured to extract from the database 110 data including, but not limited to, metadata associated with a plurality of webpages 112 and webpage elements 114, historical activity logs 120 associated with previous data interactions that are same or similar to the requested data interaction, category mappings 126 associated with the webpages 112 and the webpage elements 114, correlation matrix 128 and page/element alternatives 132. In this context, the interaction manager 150 may be configured to generate a search function 174 including one or more secondary queries 176 configured to search the database 110 and extract from the database 110 data related to the user query 162 associated with the user request 160 for use in generating a navigation map 180 to perform the requested data interaction. The one or more secondary queries 176 are generated based on the information relating to the requested data interaction that is interpreted from the user query 162. In one embodiment, a secondary query 176 may be configured to search the database 110 for those webpages 112 and webpage elements 114 that are associated with a particular interaction category 164 determined based on the user query 162. Following the utility billing example, based on determining (e.g., based on the user query 162) that the requested data interaction relates to the "utility billing" interaction category 164, a secondary query 176 may be configured to search the database 110 for those webpages 112 and webpage elements 114 that are associated with the "utility billing" interaction category 164. For example, the secondary query 176 may be configured to search the category mappings 126 (e.g., table 200 shown in FIG. 2) to determine the webpages 112 and webpage elements 114 that are assigned to the "utility billing" interaction category 164.

In one or more embodiments, the interaction manager 150 may be configured to use an ML model 166 to generate the search function 174 including one or more secondary queries 176 described above. For example, the ML model 166 may be configured to generate a search function 174 based on several pieces of data input to the ML model 166. In one embodiment, this ML model 166 is different from the ML model 166 used to generate the category mappings 126 described above. For example, the interaction manager 150 may be configured to input the particular data interaction requested to be performed (e.g. determined based on the user query 162), one or more of the interaction channels 118 associated with the requested data interaction (e.g., determined based on user query 162), or interaction category 164 associated with the requested data interaction (e.g., determined based on user query 162). The interaction manager 150 may be configured to obtain a search function 174 including one or more secondary queries 176 as an output of the ML model 166. The interaction manager 150 may be configured to search the database 110 (as described above) based on the one or more secondary queries 176 of the search function 174 to determine/extract one or more of a plurality of webpages 112, a plurality of webpage elements 114, webpage metadata 116 associated with the extracted webpages 112 and webpage elements 114, or relationships 124 between the extracted webpages 112 and webpage elements 114 (e.g., category mappings 126, at least a portion of the correlation matrix, and/or page/element alternatives 132).

At operation 608, the interaction manager 150 generates, based on the extracted data from the database 110, a navigation map 180 to perform the requested data interaction, wherein the navigation map 180 includes a sequence of webpages 112 (e.g., page sequence 182) and information 184 relating to one or more operations that are to be performed at each of the webpages 112 as part of performing the requested data interaction. In one embodiment, generating the navigation map 180 may include inputting the set of webpages 112, the webpage metadata 116 associated with the webpages 112 and the relationships 124 between one or more of the webpages 112 into a machine learning model 166 and running the machine learning model 166 to obtain the navigation map 180 as an output of the machine learning model 166.

As described above, the interaction manager 150 may be configured to generate a navigation map 180 based on at least a portion of the data extracted from the database 110. In one embodiment, the interaction manager 150 may use an ML model 166 to generate the navigation map 180 to help a user 106 perform a requested data interaction. The ML model may be trained to generate navigation maps 180 based on data extracted from the database 110 as described above. For example, the interaction manager 150 may input at least a portion of the data extracted from the database 110 into the ML model 166 and run the ML model 166 to obtain the navigation map 180 as an output of the ML model 166.

As described above, the navigation map 180 includes a page sequence 182 including a sequence of webpages 112 and webpage elements 114, and information 184 relating to one or more operations that are to be performed at each of the webpages 112 and webpage elements 114 as part of performing the requested data interaction. In one embodiment, the navigation map 180 provides the shortest path to perform the requested data interaction, wherein the shortest path comprises a page sequence 182 including a minimum number of webpages 112 and webpage elements 114, and accompanying information relating to a minimum number of operations that can be performed using the page sequence 182 to complete the requested data interaction. For example, the navigation map 180 includes a stepwise flow of a plurality of steps to be followed for performing the data interaction, wherein each step of the plurality of steps comprises one or more of an identification of a particular webpage 112 of the page sequence 182 and/or a webpage element 114 of a webpage 112, one or more operations that are to be performed at the particular webpage 112 or webpage element 114, or information 184 including instructions to perform the one or more operations and/or an estimated time to complete the one or more operations. The estimated time to complete the one or more operations may include one or more of a page-wise completion time 186 or a total completion time 188. Page-wise completion time 186 includes an estimated time to complete one or more operations on a particular webpage 112 of the navigation map 180. The total completion time 188 includes an estimated time to complete all steps/operations of the navigation map 180. In addition, the information 184 at each step of the navigation map 180 may include any other information that may help the user or the user 106 may need to perform one or more operations at the step. For example, information 184 associated with a particular step may suggest that the user 106 watch a short instructional video and/or information relating to one or more files that the user 106 may need to download or upload from a webpage 112.

Figure 7:
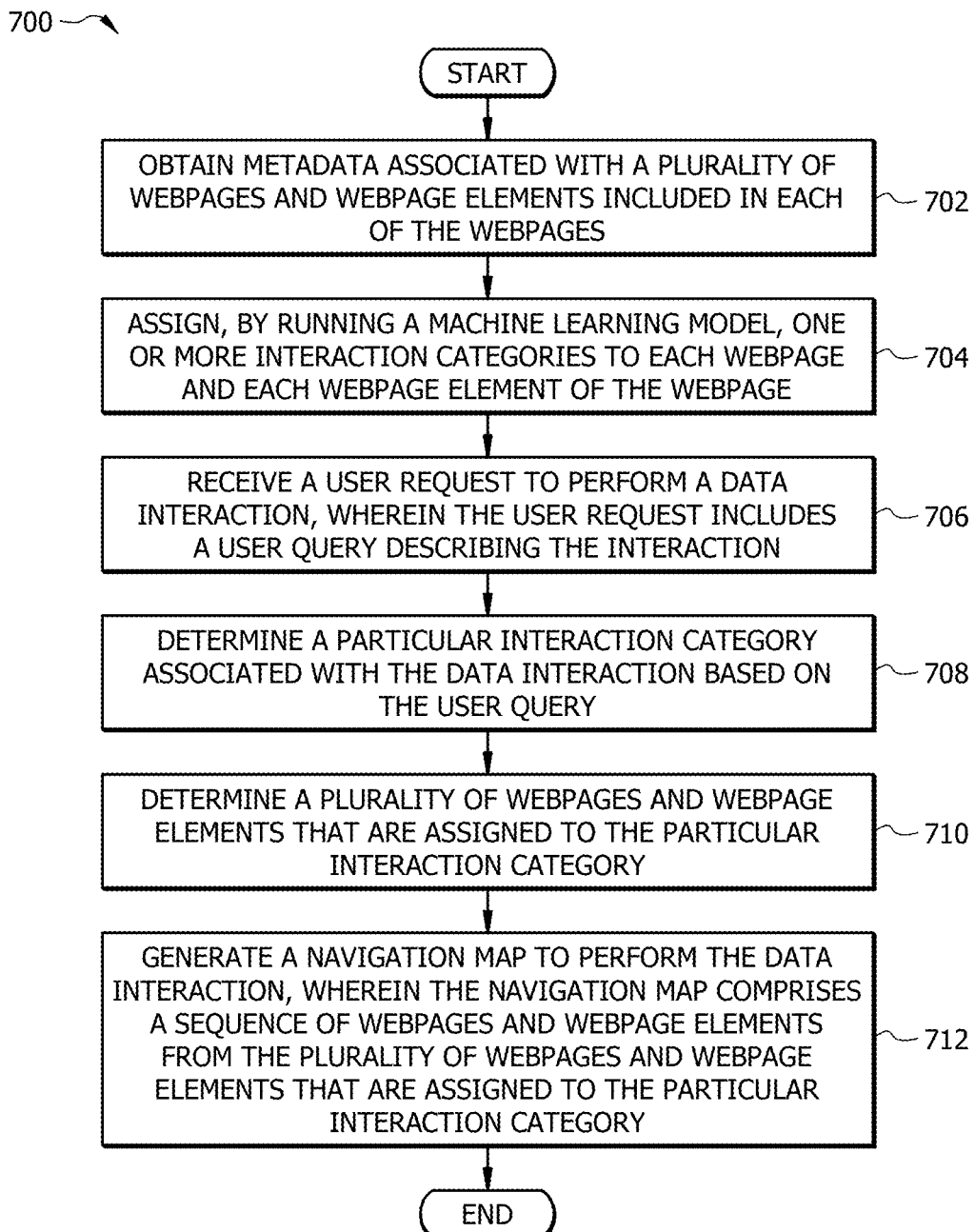
FIG. 7 illustrates a flowchart of an example method for generating category mapping for use in generating a navigation map to perform a data interaction, in accordance with one or more embodiments of the present disclosure.

FIG. 7 illustrates a flowchart of an example method 700 for generating category mapping 126 for use in generating a navigation map 180 to perform a data interaction, in accordance with one or more embodiments of the present disclosure. Method 700 may be performed by the interaction manager 150 shown in FIG. 1. The following description relating to method 700 may also refer back to FIGS. 2, 3, 4, and 5.

At operation 702, the interaction manager 150 obtains metadata (e.g., webpage metadata 116) associated with a plurality of webpages 112 and webpage elements 114 included in each of the webpages 112, wherein the webpage metadata 116 associated with a particular webpage 112 describes the content on the particular webpage 112 including each webpage element 114 of the particular webpage 112.

As described above, the interaction manager 150 uses several pieces of information to generate an appropriate navigation map 180 to serve a user request 160. As described below, some of this information may be generated by the interaction manager 150. For example, the interaction manager 150 may have access to a database 110 that stores data needed to generate a navigation map 180. As shown in FIG. 1, the database 110 may store a plurality of webpages 112, webpage elements 114 included in those webpages 112, webpage metadata 116, interaction channels 118 supported by each of the webpages 112, historical activity log 120 of previous data interactions performed by users 106 including completion times 122 relating to performing those data interactions, relationships 124 between webpages 122/webpage elements 114 including category mappings 126, correlation matrix 128, correlation metric 130, and page/element alternatives 132.

The webpages 112, webpage elements 114 and the webpage metadata 116 may be sourced from several data sources, wherein one or more of these data sources may be computing nodes 104 of the computing infrastructure 102. For example, the interaction manager 150 may have access to a plurality of data sources that store/host and/or run webpages 112. As shown in FIG. 1, example data sources may include, but are not limited to, one or more application servers 104a, one or more web servers 104b and one or more databases 104c. An application server 104a or a web server 104b is a computer that hosts a website which typically is a collection of webpages 112. In one embodiment, a data source may be owned and/or operated by a digital entity that provides a set of digital services using a set of webpages 112 hosted by the data source. For example, an application server 104a may be owned and/or operated by a utility provider that allows registered utility users to perform data interactions such as payment of utility bills using webpages 112 stored and run on the application server 104a. Another application server 104a may be owned and/or operated by a video streaming service that allows registered users of the streaming service to add, upgrade and drop services using the webpages 112 stored and run on the application server 104a. In one or more embodiments, one or more of the data sources may be a cloud server (not shown).

As described above, the term "webpage" (e.g., webpage 112) refers to a document which can be displayed in a web browser such as Firefox, Google Chrome, Opera, Microsoft Edge, or Apple Safari. Webpages are also often called just "pages." The term "webpage element or page element" (e.g., webpage element 114) refers to design features included in a webpage including, but not limited to, a widget, a button, a hyperlink, text, an image, a text field, a radio button, a section of a webpage, or a check box included in the webpage. The database 110 stores webpage metadata 116 associated with each webpage 112. Webpage metadata 116 associated with a particular webpage 112 includes, but is not limited to, information relating to the webpage 112 such as a network address (e.g., URL) for the webpage, a description of the webpage elements 114 included in the webpage 112, one or more operations that may be performed using each webpage element 114 of the webpage 112, and one or more interaction channels 118 supported by the webpage 112. The term "interaction channel" (e.g., interaction channel 118) in the context of the present disclosure refers to a type or class of software application and/or type of computing device (e.g., computing node 104). Example interaction channels 118 may include, but are not limited to, a mobile application that typically runs on a mobile device such as a smart phone and tablet computer, a web application such as a web browser that runs on a desktop computers and laptop computers, and virtual reality applications such as metaverse that run on virtual reality (VR) glasses. For each webpage 112, the database 110 stores an indication of one or more interactions channels 118 supported by the webpage 112. For example, a particular webpage 112 may support a single interaction channel 118 (e.g., web application only) or multiple interaction channels 118 (e.g., web application as well as mobile application).

At operation 704, the interaction manager 150 assigns, by running a machine learning model 166, one or more interaction categories 164 to each webpage 112 and each webpage element 114 of the webpage 112. In one embodiment, assigning the one or more interaction categories 164 includes assigning a binary value of one to each interaction category 164 determined to be associated with the webpage 112 or the webpage element 114 and assigning a binary value of zero to each interaction category 164 determined not be associated with the webpage 112 or the webpage element 114. In one embodiment, the machine learning model 166, when run by the interaction manager 150, assigns the one or more interaction categories 164 to the webpage 112 or the webpage element 114 based on the webpage metadata 116 associated with the webpage 112.

As described above, interaction manager 150 may be configured to determine the category mappings 126. As described above, category mappings 126 refer to association between a webpage 112/webpage element 114 and one or more interaction categories 164. In other words, when the category mappings 126 indicates that a particular webpage 112 is associated with a particular interaction category 164 (e.g., utility billing), this means that the particular webpage 112 relates to the particular interaction category 164 and/or may be used to perform at least one operation relating to the particular interaction category 164. The interaction manager 150 may be configured to assign one or more interaction categories 164 to each webpage 112 and webpage element 114 obtained from a data source such as application server 104a, web server 104b, and database 104c. In this context, the interaction manager 150 may use a machine learning (ML) model 166 that is trained to assign one or more interaction categories 164 to a webpage 112 or a webpage element 114 of the webpage 112 based on webpage metadata 116 associated with the webpage 112. For example, the interaction manager 150 may be configured to input to the ML model 166, a webpage 112 and webpage metadata 116 associated with the webpage 112. The ML model 166 may determine and assign one or more interaction categories 164 to the webpage 112 based on the webpage metadata 116 associated with the webpage 112. Similarly, the interaction manager 150 may be configured to input to the ML model 166, a webpage element 114 of a webpage 112 and webpage metadata 116 associated with the webpage 112. The ML model 166 may determine and assign one or more interaction categories 164 to the webpage element 114 based on the webpage metadata 116 associated with the webpage 112 of which the webpage element 114 is a part.

In one embodiment, assigning an interaction category 164 to a particular webpage 112 or a webpage element 114 may include assigning a binary value of '1' to each interaction category 164 determined to be associated with the webpage 112 or the webpage element 114 respectively, and assigning a binary value of '0' to each interaction category 164 determined not be associated with the webpage 112 or the webpage element 114 respectively. The generation of category mappings 126 including assignment of interaction categories 164 to webpages 112 and webpage elements 114 is described above in detail with reference to FIG. 2.

At operation 706, the interaction manager 150 receives a user request 160 to perform a data interaction, wherein the user request 160 includes a user query 162 describing the requested data interaction.

As described above, the interaction manager 150 may be configured to generate a navigation map 180 based on a user request 160 initiated by a user 106 to perform a particular data interaction. In this context, the interaction manager 150 may be configured to receive a user request 160 for performing a particular data interaction, wherein the user request 160 may include a user query 162 that describes the particular data interaction which the user 106 desires to perform. For example, the user query 162 may include a text query such as "how to pay water bill on my smartphone". However, it may be noted that the user query 162 may also be an audio or video message.

At operation 708, the interaction manager 150 determines a particular interaction category 164 associated with the requested data interaction based on the user query 162.

As described above, the interaction manager 150 uses several pieces of information to generate an appropriate navigation map 180 to serve a user request 160. As described below, some of this information may be generated by the interaction manager 150. For example, the interaction manager 150 may have access to a database 110 that stores data needed to generate a navigation map 180. As shown in FIG. 1, the database 110 may store a plurality of webpages 112, webpage elements 114 included in those webpages 112, webpage metadata 116, interaction channels 118 supported by each of the webpages 112, historical activity log 120 of previous data interactions performed by users 106 including completion times 122 relating to performing those data interactions, relationships 124 between webpages 122/ webpage elements 114 including category mappings 126, correlation matrix 128, correlation metric 130, and page/ element alternatives 132.

As described above, the interaction manager 150 may be configured to generate a navigation map 180 based on a user request 160 initiated by a user 106 to perform a particular data interaction, wherein the user request 160 may include a user query 162 that describes the particular data interaction which the user 106 desires to perform. For example, the user query 162 may include a text query such as "how to pay water bill on my smartphone". In response to receiving the user request 160, the interaction manager 150 may be configured to extract several pieces of information from the user query 162 included in the user request 160 and determine the particular data interaction requested to be performed and certain information relating to the data interaction. For example, based on the user query 162 "how to pay water bill on my smartphone", the interaction manager 150 may determine that the requested data interaction relates to the "utility billing" interaction category 164 and may further determine that the data interaction is to be performed using a mobile application as the interaction channel 118. Further, the interaction manager 150 may determine that the data interaction includes payment of water bill.

At operation 710, the interaction manager 150 determines a plurality of webpages 112 and webpage elements 114 that are assigned to the particular interaction category 164 associated with the requested data interaction.

As described above, after determining information relating to the requested data interaction based on the user query 162, the interaction manager 150 may be configured to extract from the database 110 data needed to generate the navigation map 180. For example, the interaction manager 150 may be configured to extract from the database 110 data including, but not limited to, metadata associated with a plurality of webpages 112 and webpage elements 114, historical activity logs 120 associated with previous data interactions that are same or similar to the requested data interaction, category mappings 126 associated with the webpages 112 and the webpage elements 114, correlation matrix 128 and page/element alternatives 132. In this context, the interaction manager 150 may be configured to generate a search function 174 including one or more secondary queries 176 configured to search the database 110 and extract from the database 110 data related to the user query 162 associated with the user request 160 for use in generating a navigation map 180 to perform the requested data interaction. The one or more secondary queries 176 are generated based on the information relating to the requested data interaction that is interpreted from the user query 162. In one embodiment, a secondary query 176 may be configured to search the database 110 for those webpages 112 and webpage elements 114 that are associated with a particular interaction category 164 determined based on the user query 162. Following the utility billing example, based on determining (e.g., based on the user query 162) that the requested data interaction relates to the "utility billing" interaction category 164, a secondary query 176 may be configured to search the database 110 for those webpages 112 and webpage elements 114 that are associated with the "utility billing" interaction category 164. For example, the secondary query 176 may be configured to search the category mappings 126 (e.g., table 200 shown in FIG. 2) to determine the webpages 112 and webpage elements 114 that are assigned to the "utility billing" interaction category 164.

At operation 712, the interaction manager 150 generates a navigation map 180 to perform the data interaction, wherein the navigation map 180 includes a sequence of webpages 112 (e.g., page sequence 182) including webpage elements 114 and information 184 relating to one or more operations that are to be performed at each of the webpages 112 and the webpage elements 114 as part of performing the requested data interaction, wherein the sequence of webpages 112 and webpage elements 114 are from the plurality of webpages 112 and webpage elements 114 that are assigned to the particular interaction category 164 associated with the requested data interaction.

As described above, the interaction manager 150 may be configured to generate a navigation map 180 based on at least a portion of the data extracted from the database 110. In one embodiment, the interaction manager 150 may use an ML model 166 to generate the navigation map 180 to help a user 106 perform a requested data interaction. The ML model may be trained to generate navigation maps 180 based on data extracted from the database 110 as described above. For example, the interaction manager 150 may input at least a portion of the data extracted from the database 110 into the ML model 166 and run the ML model 166 to obtain the navigation map 180 as an output of the ML model 166.

As described above, the navigation map 180 includes a page sequence 182 including a sequence of webpages 112 and webpage elements 114, and information 184 relating to one or more operations that are to be performed at each of the webpages 112 and webpage elements 114 as part of performing the requested data interaction. In one embodiment, the navigation map 180 provides the shortest path to perform the requested data interaction, wherein the shortest path comprises a page sequence 182 including a minimum number of webpages 112 and webpage elements 114, and accompanying information relating to a minimum number of operations that can be performed using the page sequence 182 to complete the requested data interaction. For example, the navigation map 180 includes a stepwise flow of a plurality of steps to be followed for performing the data interaction, wherein each step of the plurality of steps comprises one or more of an identification of a particular webpage 112 of the page sequence 182 and/or a webpage element 114 of a webpage 112, one or more operations that are to be performed at the particular webpage 112 or webpage element 114, or information 184 including instructions to perform the one or more operations and/or an estimated time to complete the one or more operations. The estimated time to complete the one or more operations may include one or more of a page-wise completion time 186 or a total completion time 188. Page-wise completion time 186 includes an estimated time to complete one or more operations on a particular webpage 112 of the navigation map 180. The total completion time 188 includes an estimated time to complete all steps/operations of the navigation map 180. In addition, the information 184 at each step of the navigation map 180 may include any other information that may help the user or the user 106 may need to perform one or more operations at the step. For example, information 184 associated with a particular step may suggest that the user 106 watch a short instructional video and/or information relating to one or more files that the user 106 may need to download or upload from a webpage 112.

In one embodiment, the interaction manager 150 generates the navigation map 180 based only on those webpages 112 and webpage elements 114 that support the interaction category 164 determined for the requested data interaction based on the user query 162. For example, the interaction manager 150 inputs to the ML model 166 only those webpages 112/webpage elements 114 (and webpage metadata 116) that support the interaction channel 118 of the requested data interaction. Thus, a sequence of webpages 112 and/or webpage elements 114 included in the navigation map 180 is selected from only those webpages 112 and webpage elements 114 that support the interaction channel 118 associated with the requested data interaction.

Figure 8:
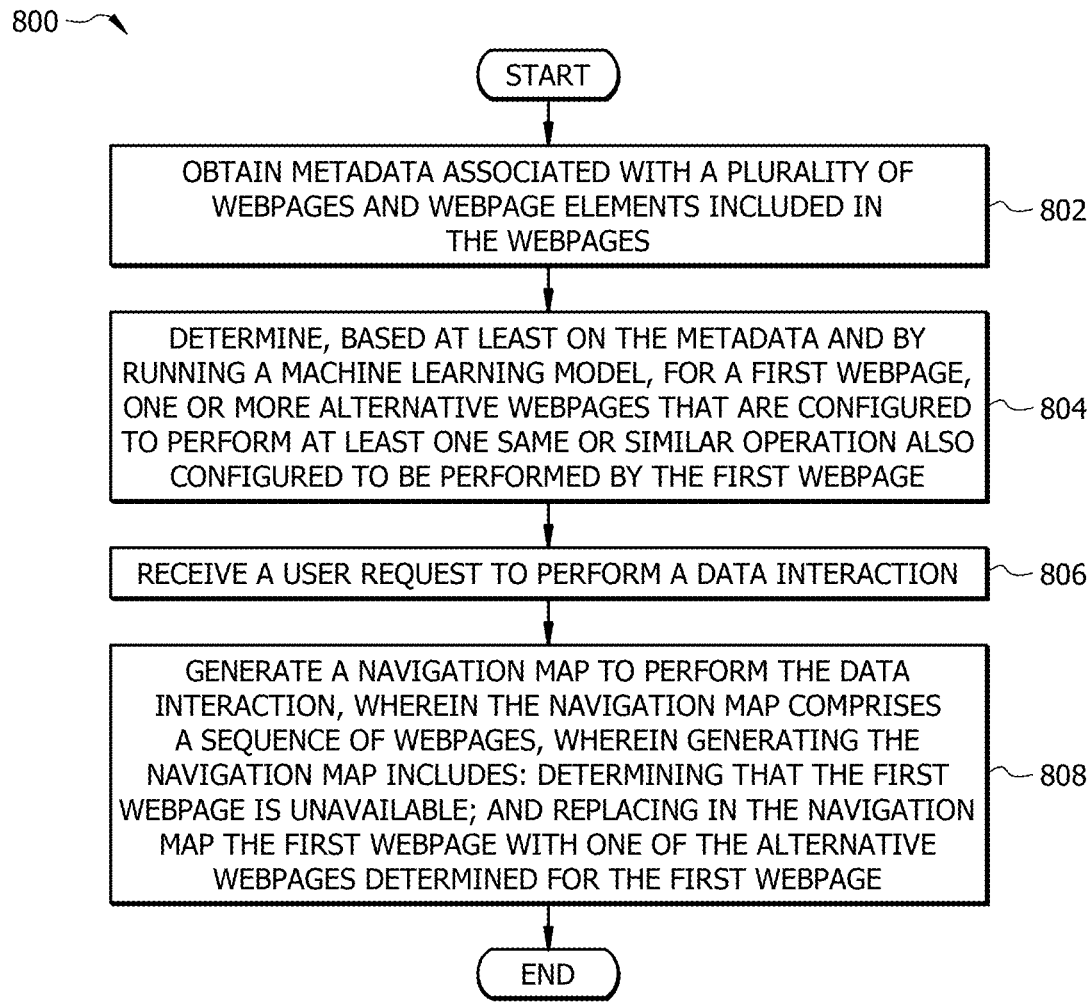
FIG. 8 illustrates a flowchart of an example method for generating page/element alternatives 132 for use in generating a navigation map to perform a data interaction, in accordance with one or more embodiments of the present disclosure.

FIG. 8 illustrates a flowchart of an example method 800 for generating page/element alternatives 132 for use in generating a navigation map 180 to perform a data interaction, in accordance with one or more embodiments of the present disclosure. Method 800 may be performed by the interaction manager 150 shown in FIG. 1. The following description relating to method 800 may also refer back to FIGS. 2, 3, 4, and 5.

At operation 802, the interaction manager 150 obtains metadata (e.g., webpage metadata 116) associated with a plurality of webpages 112 and webpage elements 114 included in each of the webpages 112, wherein the webpage metadata 116 associated with a particular webpage 112 describes the content on the particular webpage 112 including each webpage element 114 of the particular webpage 112.

As described above, the interaction manager 150 uses several pieces of information to generate an appropriate navigation map 180 to serve a user request 160. As described below, some of this information may be generated by the interaction manager 150. For example, the interaction manager 150 may have access to a database 110 that stores data needed to generate a navigation map 180. As shown in FIG. 1, the database 110 may store a plurality of webpages 112, webpage elements 114 included in those webpages 112, webpage metadata 116, interaction channels 118 supported by each of the webpages 112, historical activity log 120 of previous data interactions performed by users 106 including completion times 122 relating to performing those data interactions, relationships 124 between webpages 122/webpage elements 114 including category mappings 126, correlation matrix 128, correlation metric 130, and page/element alternatives 132.

The webpages 112, webpage elements 114 and the webpage metadata 116 may be sourced from several data sources, wherein one or more of these data sources may be computing nodes 104 of the computing infrastructure 102. For example, the interaction manager 150 may have access to a plurality of data sources that store/host and/or run webpages 112. As shown in FIG. 1, example data sources may include, but are not limited to, one or more application servers 104a, one or more web servers 104b and one or more databases 104c. An application server 104a or a web server 104b is a computer that hosts a website which typically is a collection of webpages 112. In one embodiment, a data source may be owned and/or operated by a digital entity that provides a set of digital services using a set of webpages 112 hosted by the data source. For example, an application server 104a may be owned and/or operated by a utility provider that allows registered utility users to perform data interactions such as payment of utility bills using webpages 112 stored and run on the application server 104a. Another application server 104a may be owned and/or operated by a video streaming service that allows registered users of the streaming service to add, upgrade and drop services using the webpages 112 stored and run on the application server 104a. In one or more embodiments, one or more of the data sources may be a cloud server (not shown).

As described above, the term "webpage" (e.g., webpage 112) refers to a document which can be displayed in a web browser such as Firefox, Google Chrome, Opera, Microsoft Edge, or Apple Safari. Webpages are also often called just "pages." The term "webpage element or page element" (e.g., webpage element 114) refers to design features included in a webpage including, but not limited to, a widget, a button, a hyperlink, text, an image, a text field, a radio button, a section of a webpage, or a check box included in the webpage. The database 110 stores webpage metadata 116 associated with each webpage 112. Webpage metadata 116 associated with a particular webpage 112 includes, but is not limited to, information relating to the webpage 112 such as a network address (e.g., URL) for the webpage, a description of the webpage elements 114 included in the webpage 112, one or more operations that may be performed using each webpage element 114 of the webpage 112, and one or more interaction channels 118 supported by the webpage 112. The term "interaction channel" (e.g., interaction channel 118) in the context of the present disclosure refers to a type or class of software application and/or type of computing device (e.g., computing node 104). Example interaction channels 118 may include, but are not limited to, a mobile application that typically runs on a mobile device such as a smart phone and tablet computer, a web application such as a web browser that runs on a desktop computers and laptop computers, and virtual reality applications such as metaverse that run on virtual reality (VR) glasses. For each webpage 112, the database 110 stores an indication of one or more interactions channels 118 supported by the webpage 112. For example, a particular webpage 112 may support a single interaction channel 118 (e.g., web application only) or multiple interaction channels 118 (e.g., web application as well as mobile application).

At operation 804, the interaction manager 150 determines, based at least in part on the metadata (e.g., webpage metadata 116) and by running a machine learning model 166, for a first webpage 112 of the plurality of webpages 112, one or more alternative webpages 112 that are configured to perform at least one same or similar operation also configured to be performed by the first webpage 112. In one embodiment, generating the one or more alternative webpages 112 includes obtaining a correlation matrix 128 for the plurality of webpages 112 and webpage elements 114, wherein the correlation matrix 128 indicates a degree of similarity between each pair of webpages 112, each pair of webpage elements 114, and each pair of webpage 112 and webpage element 114. The interaction manager 150 may then determine, by running the machine learning model 166, the one or more alternative webpages 112 for the first webpage 112 based on the similarity of the first webpage 112 to the one or more alternative webpages 112 as indicated by the correlation matrix 128.

As described above, the interaction manager 150 may be configured to generate the correlation matrix 128. As described above, the correlation matrix 128 indicates a degree of similarity between each pair of webpages 112, each pair of webpage elements 114, and each pair of webpage 112 and webpage element 114. In one embodiment, the correlation matrix 128 represents the degree of similarity as a correlation metric 130 which is a numerical value that indicates the degree of similarity between a pair of webpages 112, a pair of webpage elements 114 or a pair of webpage 112 and webpage element 114. Generation of the correlation matrix 128 is described above in detail with reference to FIG. 3.

In one or more embodiments, the interaction manager 150 may be configured to generate the page/element alternatives 132, for example, based at least one the correlation matrix 128. As described above, page/element alternatives 132 refers to information relating to alternative webpages 112 or webpage elements 114 that are configured to perform at least one same or similar operation. In other words, each of the alternative webpages 112 may be used to perform a same or similar operation such that an alternative webpage may take the place of another webpage in relation to performing the operation. For example, multiple webpages 112 may allow a user to submit a payment for a utility bill. In this case, the multiple webpages 112 may be used as alternatives to each other. For a particular webpage 112 the database 110 may store information relating to one or more alternative webpages 112 that are configured to perform at least one same or similar operation also configured to be performed by the particular webpage 112. Similarly, for a particular webpage element 114 the database 110 may store information relating to one or more alternative webpage elements 114 that are configured to perform at least one same or similar operation also configured to be performed by the particular webpage element 114.

In one embodiment, to determine one or more alternatives to a particular webpage 112, interaction manager 150 may search the correlation matrix 128 for all those webpages 112 that have at least a threshold value (shown as correlation threshold 172 in FIG. 1) of the correlation metric 130 relating to the particular webpage 112. In other words, the interaction manager 150 identifies all those webpages 112 that have at least a threshold degree of similarity to the particular webpage 112. For example, referring to FIG. 3, to determine an alternative to page 1, the interaction manager 150 examines the numerical values of the correlation metric 130 in row 312. Assuming that the correlation threshold 172 is 5, the interaction manager 150 identifies page 3 as a potential alternative webpage 112. Button 1 with a value of 9 is ignored as button 1 is part of page 1. Once one or more potential webpages 112 having a value of correlation metric 130 that equals or exceeds the correlation threshold 172 are identified, the interaction manager 150 determines one or more alternative to the particular webpage 112 from the identified one or more potential alternatives. For example, the interaction manager 150 may determine from the potential alternative webpages an alternative webpage 112 that has this highest numerical value of the correlation metric 130 relating to the particular webpage 112. This alternative webpage 112 is designated as the primary alternative webpage 112. The interaction manager 150 may be configured to identify one or more additional alternative webpages 112 that are associated with the next highest value of the correlation metric 130. The determined alternative webpages 112 of the particular webpage 112 are stored as page/element alternatives 132 in database 110.

In one or more embodiments, the interaction manager 150 may be configured to use an ML model 166 to determine the page/element alternatives 132. The ML model 166 may be trained to determine one or more alternatives to a particular webpage 112/webpage element 114 based on the correlation matrix. In one embodiment, the interaction manager 150 may input a candidate webpage 112 and the correlation matrix 128 as input to the ML model and obtain one or more alternative webpages 112 to the candidate webpage 112 as an output of the ML model 166. It may be noted that the ML model 166 trained to generate the page/element alternatives 132 may be the same or different from the ML model 166 trained to generate the correlation matrix 128, the ML model 166 trained to generate the category mappings 126, the ML model trained to generate the search function 174, and/or the ML model trained to generate the navigation map 180.

At operation 806, the interaction manager 150 receives a user request 160 to perform a data interaction.

As described above, the interaction manager 150 may be configured to generate a navigation map 180 based on a user request 160 initiated by a user 106 to perform a particular data interaction. In this context, the interaction manager 150 may be configured to receive a user request 160 for performing a particular data interaction, wherein the user request 160 may include a user query 162 that describes the particular data interaction which the user 106 desires to perform. For example, the user query 162 may include a text query such as "how to pay water bill on my smartphone". However, it may be noted that the user query 162 may also be an audio or video message.

At operation 808, the interaction manager 150 generates a navigation map 180 to perform the requested data interaction, wherein the navigation map 180 includes a sequence of webpages 112 (e.g., page sequence 182) including webpage elements 114 and information 184 relating to one or more operations that are to be performed using each of the webpages 112 and the webpage elements 114 as part of performing the requested data interaction, wherein the sequence of webpages 112 includes the first webpage 112. In one embodiment, generating the navigation map 180 includes determining that the first webpage 112 is unavailable and replacing in the navigation map 180 the first webpage 112 with one of the alternative webpages 112 determined for the first webpage 112.

As described above, the interaction manager 150 may be configured to generate a navigation map 180 based on at least a portion of the data extracted from the database 110. In one embodiment, the interaction manager 150 may use an ML model 166 to generate the navigation map 180 to help a user 106 perform a requested data interaction. The ML model may be trained to generate navigation maps 180 based on data extracted from the database 110 as described above. For example, the interaction manager 150 may input at least a portion of the data extracted from the database 110 into the ML model 166 and run the ML model 166 to obtain the navigation map 180 as an output of the ML model 166.

As described above, the navigation map 180 includes a page sequence 182 including a sequence of webpages 112 and webpage elements 114, and information 184 relating to one or more operations that are to be performed at each of the webpages 112 and webpage elements 114 as part of performing the requested data interaction. In one embodiment, the navigation map 180 provides the shortest path to perform the requested data interaction, wherein the shortest path comprises a page sequence 182 including a minimum number of webpages 112 and webpage elements 114, and accompanying information relating to a minimum number of operations that can be performed using the page sequence 182 to complete the requested data interaction. For example, the navigation map 180 includes a stepwise flow of a plurality of steps to be followed for performing the data interaction, wherein each step of the plurality of steps comprises one or more of an identification of a particular webpage 112 of the page sequence 182 and/or a webpage element 114 of a webpage 112, one or more operations that are to be performed at the particular webpage 112 or webpage element 114, or information 184 including instructions to perform the one or more operations and/or an estimated time to complete the one or more operations. The estimated time to complete the one or more operations may include one or more of a page-wise completion time 186 or a total completion time 188. Page-wise completion time 186 includes an estimated time to complete one or more operations on a particular webpage 112 of the navigation map 180. The total completion time 188 includes an estimated time to complete all steps/operations of the navigation map 180. In addition, the information 184 at each step of the navigation map 180 may include any other information that may help the user or the user 106 may need to perform one or more operations at the step. For example, information 184 associated with a particular step may suggest that the user 106 watch a short instructional video and/or information relating to one or more files that the user 106 may need to download or upload from a webpage 112.

In one or more embodiments, the interaction manager 150 may be configured to use the page/element alternatives 132 in generating a navigation map 180. For example, when a particular webpage 112 in the page sequence 182 generated for a navigation map 180 is unavailable (e.g., due to technical issues), the interaction manager 150 may search the page/element alternatives 132 stored in the database 110 and replace the unavailable webpage 112 in the page sequence 182 with an alternative webpage 112. For example, referring back to table 400 shown in FIG. 4, when page 1 from the page sequence 182 is unavailable, the interaction manager 150 may replace page 1 with page 3 which is the primary alternative of page 1. This avoids the navigation map 180 or a portion thereof from being unusable for non-availability of a webpage 112 or webpage element 114.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:
a memory that stores a machine learning model trained to assign an interaction category to one or more of a webpage or one or more webpage elements of the webpage, wherein the interaction category is associated with a type of operation that can be performed using a webpage or a webpage element of a webpage, wherein a webpage element of a webpage comprises one or more of a widget, a button, a hyperlink, text, an image, a text field, a radio button, or a check box included in the webpage; and
a processor communicatively coupled to the memory and configured to:
obtain metadata associated with a plurality of webpages and webpage elements included in each of the webpages, wherein the metadata associated with a particular webpage describes the content on the particular webpage including each webpage element of the particular webpage;
assign, by running the machine learning model, one or more interaction categories to each webpage and each webpage element of the webpage, wherein assigning the one or more interaction categories comprises:
assigning a binary value of one to each interaction category determined to be associated with the webpage or the webpage element; and
assigning a binary value of zero to each interaction category determined not be associated with the webpage or the webpage element;
wherein the machine learning model, when run by the processor, assigns the one or more interaction categories to the webpage or the webpage element based on the metadata associated with the webpage;
receive a user request to perform a data interaction, wherein the user request comprises a user query describing the data interaction;
determine a particular interaction category associated with the data interaction based on the user query;

determine a plurality of webpages and webpage elements that are assigned to the particular interaction category; and generate a navigation map to perform the data interaction, wherein the navigation map comprises a sequence of webpages including webpage elements and information relating to one or more operations that are to be performed at each of the webpages and the webpage elements as part of performing the data interaction, wherein the sequence of webpages and webpage elements are from the plurality of webpages and webpage elements that are assigned to the particular interaction category.

2. The system of claim 1, wherein the processor is further configured to:
assign a relevancy weight to each webpage of the plurality of webpages, wherein the relevancy weight assigned to a particular webpage is indicative of a degree of relevancy of the webpage to the user query, wherein assigning the relevancy weight to a particular webpage comprises:
determining a numerical value by adding the binary values assigned to the particular webpage and each webpage element of the particular webpage in the particular interaction category associated with the data interaction; and
assign the numerical value as the relevancy weight of the particular webpage.

3. The system of claim 2, wherein the processor is further configured to determine the plurality of webpages that are assigned to the particular interaction category by:
determining a set of webpages assigned to the interaction category associated with the data interaction and having a numerical value of the relevancy weight that equals or exceeds a relevancy threshold; and
identifying from the set of webpages the determined webpages for inclusion in the plurality of webpages that are assigned to the particular interaction category.

4. The system of claim 1, wherein the processor is further configured to store in a database a mapping of each webpage or a webpage element to one or more of the interaction categories, wherein the database further stores the metadata associated with the plurality of webpages and the webpage elements included in each of the webpages.

5. The system of claim 4, wherein the processor is further configured to:
generate a search function based on the user query, wherein the search function comprises one or more secondary queries configured to search the database and extract from the database the plurality of webpages and webpage elements that are assigned to the particular interaction category; and
run the search function in the database to extract the plurality of webpages and webpage elements that are assigned to the particular interaction category.

6. The system of claim 4, wherein the database is a graph database that is configured to store data as a network of data nodes and relationships between the data nodes.

7. The system of claim 1, wherein the processor is further configured to:
receive, as part of the user request, an indication of a channel to be used to perform the data interaction;
generate a search function to search the plurality of webpages for only those webpages that are compatible with the indicated channel to be used to perform the data interaction and are assigned to the particular interaction category; and wherein the webpages in the sequence of webpages associated with the navigation map are compatible with the indicated channel.

8. A method comprising:
obtaining metadata associated with a plurality of webpages and webpage elements included in each of the webpages, wherein the metadata associated with a particular webpage describes the content on the particular webpage including each webpage element of the particular webpage;
assigning, by running a machine learning model, one or more interaction categories to each webpage and each webpage element of the webpage, wherein assigning the one or more interaction categories comprises:
assigning a binary value of one to each interaction category determined to be associated with the webpage or the webpage element; and
assigning a binary value of zero to each interaction category determined not be associated with the webpage or the webpage element;
wherein:
the machine learning model is trained to assign an interaction category to one or more of a webpage or one or more webpage elements of the webpage;
the interaction category is associated with a type of operation that can be performed using a webpage or a webpage element of a webpage;
a webpage element of a webpage comprises one or more of a widget, a button, a hyperlink, text, an image, a text field, a radio button, or a check box included in the webpage; and
the machine learning model, when run by the processor, assigns the one or more interaction categories to the webpage or the webpage element based on the metadata associated with the webpage;
receiving a user request to perform a data interaction, wherein the user request comprises a user query describing the data interaction;
determining a particular interaction category associated with the data interaction based on the user query;
determining a plurality of webpages and webpage elements that are assigned to the particular interaction category; and
generating a navigation map to perform the data interaction, wherein the navigation map comprises a sequence of webpages including webpage elements and information relating to one or more operations that are to be performed at each of the webpages and the webpage elements as part of performing the data interaction, wherein the sequence of webpages and webpage elements are from the plurality of webpages and webpage elements that are assigned to the particular interaction category.

9. The method of claim 8, further comprising:
assigning a relevancy weight to each webpage of the plurality of webpages, wherein the relevancy weight assigned to a particular webpage is indicative of a degree of relevancy of the webpage to the user query, wherein assigning the relevancy weight to a particular webpage comprises:
determining a numerical value by adding the binary values assigned to the particular webpage and each webpage element of the particular webpage in the particular interaction category associated with the data interaction; and
assigning the numerical value as the relevancy weight of the particular webpage.

10. The method of claim 9, wherein determining the plurality of webpages that are assigned to the particular interaction category comprises:
   determining a set of webpages assigned to the interaction category associated with the data interaction and having a numerical value of the relevancy weight that equals or exceeds a relevancy threshold; and
   identifying from the set of webpages the determined webpages for inclusion in the plurality of webpages that are assigned to the particular interaction category.

11. The method of claim 8, further comprising storing in a database a mapping of each webpage or a webpage element to one or more of the interaction categories, wherein the database further stores the metadata associated with the plurality of webpages and the webpage elements included in each of the webpages.

12. The method of claim 11, further comprising:
   generating a search function based on the user query, wherein the search function comprises one or more secondary queries configured to search the database and extract from the database the plurality of webpages and webpage elements that are assigned to the particular interaction category; and
   running the search function in the database to extract the plurality of webpages and webpage elements that are assigned to the particular interaction category.

13. The method of claim 11, wherein the database is a graph database that is configured to store data as a network of data nodes and relationships between the data nodes.

14. The method of claim 8, further comprising:
   receiving, as part of the user request, an indication of a channel to be used to perform the data interaction;
   generating a search function to search the plurality of webpages for only those webpages that are compatible with the indicated channel to be used to perform the data interaction and are assigned to the particular interaction category; and
   wherein the webpages in the sequence of webpages associated with the navigation map are compatible with the indicated channel.

15. A non-transitory computer-readable medium storing instructions that when executed by a processor cause the processor to:
   obtain metadata associated with a plurality of webpages and webpage elements included in each of the webpages, wherein the metadata associated with a particular webpage describes the content on the particular webpage including each webpage element of the particular webpage;
   assign, by running a machine learning model, one or more interaction categories to each webpage and each webpage element of the webpage, wherein assigning the one or more interaction categories comprises:
      assigning a binary value of one to each interaction category determined to be associated with the webpage or the webpage element; and
      assigning a binary value of zero to each interaction category determined not be associated with the webpage or the webpage element;
      wherein:
         the machine learning model is trained to assign an interaction category to one or more of a webpage or one or more webpage elements of the webpage;
         the interaction category is associated with a type of operation that can be performed using a webpage or a webpage element of a webpage;
         a webpage element of a webpage comprises one or more of a widget, a button, a hyperlink, text, an image, a text field, a radio button, or a check box included in the webpage; and
         the machine learning model, when run by the processor, assigns the one or more interaction categories to the webpage or the webpage element based on the metadata associated with the webpage;
   receive a user request to perform a data interaction, wherein the user request comprises a user query describing the data interaction;
   determine a particular interaction category associated with the data interaction based on the user query;
   determine a plurality of webpages and webpage elements that are assigned to the particular interaction category; and
   generate a navigation map to perform the data interaction, wherein the navigation map comprises a sequence of webpages including webpage elements and information relating to one or more operations that are to be performed at each of the webpages and the webpage elements as part of performing the data interaction, wherein the sequence of webpages and webpage elements are from the plurality of webpages and webpage elements that are assigned to the particular interaction category.

16. The non-transitory computer-readable medium of claim 15, wherein the instructions further cause the processor to:
   assign a relevancy weight to each webpage of the plurality of webpages, wherein the relevancy weight assigned to a particular webpage is indicative of a degree of relevancy of the webpage to the user query, wherein assigning the relevancy weight to a particular webpage comprises:
      determining a numerical value by adding the binary values assigned to the particular webpage and each webpage element of the particular webpage in the particular interaction category associated with the data interaction; and
      assigning the numerical value as the relevancy weight of the particular webpage.

17. The non-transitory computer-readable medium of claim 16, wherein determining the plurality of webpages that are assigned to the particular interaction category comprises:
   determining a set of webpages assigned to the interaction category associated with the data interaction and having a numerical value of the relevancy weight that equals or exceeds a relevancy threshold; and
   identifying from the set of webpages the determined webpages for inclusion in the plurality of webpages that are assigned to the particular interaction category.

18. The non-transitory computer-readable medium of claim 15, wherein the instructions further cause the processor to store in a database a mapping of each webpage or a webpage element to one or more of the interaction categories, wherein the database further stores the metadata associated with the plurality of webpages and the webpage elements included in each of the webpages.

19. The non-transitory computer-readable medium of claim 18, wherein the instructions further cause the processor to:
   generate a search function based on the user query, wherein the search function comprises one or more secondary queries configured to search the database and extract from the database the plurality of webpages and webpage elements that are assigned to the particular interaction category; and run the search function in the database to extract the plurality of webpages and webpage elements that are assigned to the particular interaction category.

20. The non-transitory computer-readable medium of claim 18, wherein the database is a graph database that is configured to store data as a network of data nodes and relationships between the data nodes.

* * * * *